US011908444B2

(12) United States Patent
Kleijn et al.

(10) Patent No.: US 11,908,444 B2
(45) Date of Patent: Feb. 20, 2024

(54) WAVE-DOMAIN APPROACH FOR CANCELLING NOISE ENTERING AN APERTURE

(71) Applicant: GN Hearing A/S, Ballerup (DK)

(72) Inventors: Willem Bastiaan Kleijn, Lower Hutt (NZ); Daan Ratering, Delft (NL)

(73) Assignee: GN HEARING A/S, Ballerup (DK)

( * ) Notice: Subject to any disclaimer, the term of this patent is extended or adjusted under 35 U.S.C. 154(b) by 45 days.

(21) Appl. No.: 17/509,336

(22) Filed: Oct. 25, 2021

(65) Prior Publication Data

US 2023/0125941 A1 Apr. 27, 2023

(51) Int. Cl.
*G10K 11/178* (2006.01)

(52) U.S. Cl.
CPC .. *G10K 11/1785* (2018.01); *G10K 2210/3012* (2013.01)

(58) Field of Classification Search
CPC ............. G10K 11/1785; G10K 11/178; G10K 2210/3012; H04R 1/323
See application file for complete search history.

(56) References Cited

U.S. PATENT DOCUMENTS

2010/0124341 A1* 5/2010 Kano .................. H04R 1/1083 381/94.1
2015/0043736 A1* 2/2015 Olsen ........................ H04S 7/30 381/17
2015/0172813 A1* 6/2015 Goto ................ G10K 11/17854 381/71.1
2015/0264510 A1* 9/2015 Jin ............................ H04S 7/30 381/303

FOREIGN PATENT DOCUMENTS

WO WO-2018163810 A1 * 9/2018 ........... G10K 11/178
WO WO-2021100461 A1 * 5/2021

* cited by examiner

*Primary Examiner* — David L Ton
(74) *Attorney, Agent, or Firm* — Vista IP Law Group, LLP

(57) ABSTRACT

An apparatus for providing active noise control, includes: one or more microphones configured to detect sound entering through an aperture of a building structure; a set of speakers configured to provide sound output for cancelling or reducing at least some of the sound; and a processing unit communicatively coupled to the set of speakers, wherein the processing unit is configured to provide control signals to operate the speakers, wherein the control signals are independent of an error-microphone output.

31 Claims, 9 Drawing Sheets

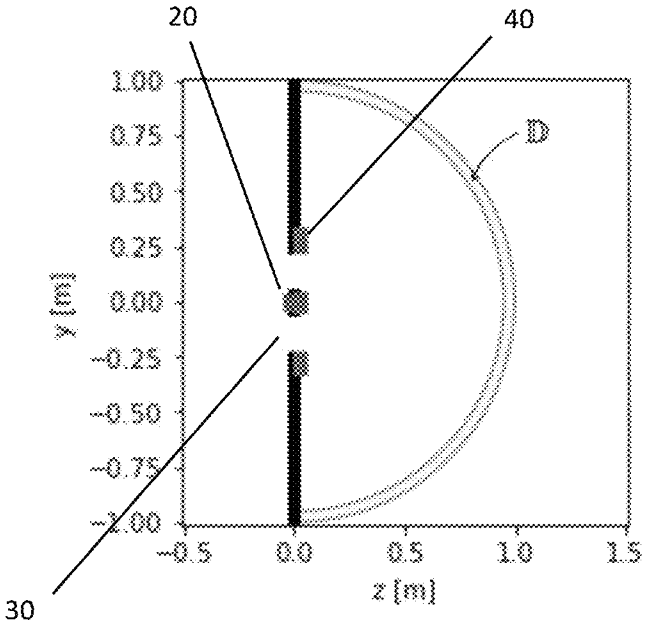
FIG. 10
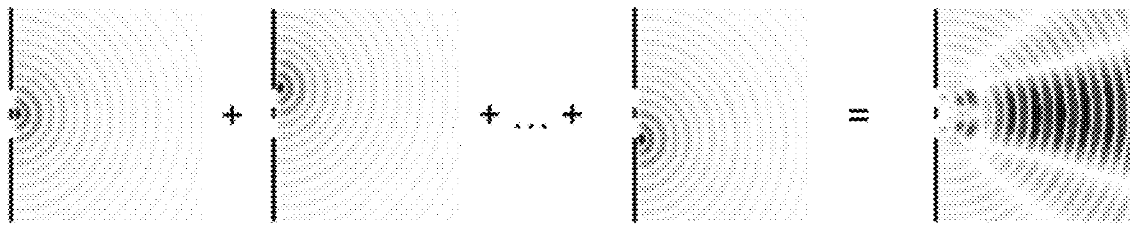
FIG. 11
| Noise type | Rumbler siren | | Airplane Noise | | White Noise | |
|---|---|---|---|---|---|---|
| Array | G | S | G | S | G | S |
| **NLMS** | -5.2 | -3.5 | -7.6 | -4.5 | -9.2 | -4.3 |
| **WDC-M** | -6.1 | -1.3 | -6.6 | -2.0 | -8.1 | -2.8 |
| **WDC-P** | -4.0 | -2.2 | - | - | - | - |
| **WDC-O** | -10.6 | -4.9 | -10.6 | -4.7 | -10.0 | -4.1 |
FIG. 12

$\overline{\mathrm{SEG}_f}(k)$, with very narrow 99% confidence interval for grid array simulations in 3D, canceling rumbler-siren noise.

First 0.4 s of $\mathrm{SEG}_t$ 3D grid array results for all controllers, showing long the convergence time of NLMS controller.

$\overline{\mathrm{SEG}_f}(k)$ for NLMS and WDC-O, with very narrow 99% confidence interval. 3D results for white noise signal, at 0°, 30° and 60° angle.

WAVE-DOMAIN APPROACH FOR CANCELLING NOISE ENTERING AN APERTURE

FIELD

The present disclosure relates to systems and methods for active noise cancellation, and more particularly, to systems and methods for cancelling noise entering an aperture, such as a window of a room.

BACKGROUND

Noise pollution is a major health threat to society. Active Noise Control (ANC) systems that attenuate noise propagating through open windows (apertures) have the potential to create quieter homes while maintaining ventilation and sight through the apertures. ANC systems employ loudspeakers to produce anti-noise sound-fields that reduce the sound energy in noise-cancelling headphones or over large regions such as airplane cabins. Actively controlling sound propagating through open windows is being studied. The objective for these systems is to reduce the sound energy in all directions from the aperture into the room. Current methods employ closed-loop algorithms, leading to long convergence times, heavy computational load and the need for a large number of error microphones being positioned in the room. These drawbacks limit the feasibility of such systems.

Most ANC systems for apertures utilize closed-loop Least Mean Squares (LMS) algorithms, such as the Filtered-x LMS (FxLMS) algorithm, or its multi-channel equivalent, the multiple-error LMS. These closed-loop algorithms aim to minimize error signals at error microphones placed in the room by adapting signals generated by loudspeakers in the aperture.

SUMMARY

Wave-domain spatial control of the sound produced by multi-speaker sound systems is described herein. Such a wave-domain algorithm uses a temporal frequency domain basis function expansion over a control region. The sound-field from the aperture and loudspeaker array can be expressed in these basis functions and their sum can be minimized in a least squares sense.

The wave-domain approach to ANC for apertures described herein addresses the shortcomings of the closed-loop LMS approach. It intrinsically ensures global control, because it cancels noise in all directions from the aperture, and does not require microphones positioned in the room. Using the wave-domain approach for ANC, and performing ANC for a room without using error-speakers in the room, are believed to be unconventional. In the wave-domain approach, the optimal filter-weights that minimize far-field sound energy for each frequency is calculated. Also, Acoustic Transfer Functions (ATFs) that describe the sound propagation through apertures and from loudspeakers are utilized. The wave-domain algorithm operates in the temporal frequency domain. Hence it is desirable to transform signals with the Short-time Fourier Transform (STFT). This operation induces a filter-delay equal to the window-size of the STFT. The delay can be compensated for by signal prediction or microphone placement.

The wave-domain ANC for apertures described herein can outperform current LMS systems. The wave-domain ANC involves basis function orthonormalization with Cholesky decomposition, and matrix implementation of filter-weight calculation. An advantage of the wave-domain control system over existing LMS-based systems is that the filter weights are calculated off-line, leading to a lower computational effort. Furthermore, these coefficients are computed independent of the incoming noise from stationary sound source. Therefore, the wave-domain approach itself requires no time or significantly less time (compared to existing approaches) to converge on a solution. Its performance is affected by the algorithmic delay compensation method, the accuracy with which the aperture is represented and the physical characteristics of the microphone and loudspeaker arrays. In other cases, the apparatus and method described herein may be used to provide ANC for a moving sound source (e.g., airplane, car, etc.). In such cases, wavefront changes direction, and the filter weights (or coefficients) are updated continuously, and are not computed off-line.

An apparatus for providing active noise control, includes: one or more microphones configured to detect sound entering through an aperture of a building structure; a set of speakers configured to provide sound output for cancelling or reducing at least some of the sound; and a processing unit communicatively coupled to the set of speakers, wherein the processing unit is configured to provide control signals to operate the speakers, wherein the control signals are independent of an error-microphone output.

Optionally, the processing unit is configured to obtain filter weights for the speakers, and wherein the control signals are based on the filter weights.

Optionally, the filter weights may be determined offline (i.e., while the apparatus is not performing active noise control), by the processing unit of the apparatus, or by another processing unit. Then, while the apparatus is operating to perform active noise control, the processing unit of the apparatus processes sound entering the aperture "online" based on the filter weights to determine control signals for controlling the speakers. The filter weights may be stored in a non-transitory medium accessible by the processing unit of the apparatus.

Optionally, the filter weights for the speakers are independent of the error-microphone output.

Optionally, the filter weights for the speakers are based on an open-loop algorithm.

Optionally, the filter weights for the speakers are determined off-line.

Optionally, the filter-weights for the speakers are based on an orthonormal set of basis functions.

Optionally, the filter-weights for the speakers are based on inner products between the basis functions in the orthonormal set and acoustic transfer functions of the speakers.

Optionally, the filter-weights for the speakers are based on a wave-domain algorithm.

Optionally, the wave-domain algorithm provides a lower computation cost compared to a least-mean-squares (LMS) algorithm.

Optionally, the wave-domain algorithm operates in a temporal frequency domain, and wherein the processing unit is configured to transform signals with short-time Fourier Transform.

Optionally, the short-time Fourier Transform provides a delay, and wherein the apparatus is configured to compensate for the delay using signal prediction and/or placement of the one or more microphones.

Optionally, the building structure comprises a room, and wherein the processing unit is configured to operate the speakers so that at least some of the sound is cancelled or reduced within a region that is located behind the aperture inside the room.

Optionally, the region covers an entirety of the aperture so that the region intersects sound entering the room through the aperture from all directions.

Optionally, the region has a width that is anywhere from 0.5 meter to 3 meters.

Optionally, the region has a volume that is less than 10% of a volume of the room.

Optionally, the processing unit is configured to obtain filter weights for the speakers, the filter weights being based on an algorithm in which the region is defined by a shell having a defined thickness.

Optionally, the shell comprises a partial spherical shell.

Optionally, the building structure comprises a room, and wherein the aperture comprises a window or a door of the room.

Optionally, the one or more microphones are positioned and/or oriented to detect the sound before the sound enters through the aperture.

Optionally, the processing unit is configured to provide the control signals to operate the speakers without requiring the error-microphone output from any error-microphone (e.g., any error-microphone in a room).

Optionally, the processing unit is configured to obtain filter weights for the speakers, the filter weights being based on transfer function(s) for the aperture modeled as:

$$H^{ap}(x, k, \theta_0, \phi_0) = \frac{jck\rho 0}{2\pi}\hat{\omega}_0 \Delta L_x \Delta L_y \sum_{i=1}^{\hat{P}} D_i$$

where x is a position, k is a wave number, ($\theta_0$, $\varphi_0$) is incident angle of a plane wave representing noise, j is an imaginary number, c is the speed of sound, $w\hat{}_0$ is a gain constant, $\Delta L_x$ and $\Delta L_y$ are aperture section dimensions and $P\hat{}$ is a number of aperture sections, and $D_i$ is a directivity.

Optionally, the processing unit is configured to obtain filter weights for the speakers, the filter weights being based on a matrix C and a matrix a, wherein:

$$C=RH_f^{ls} \text{ and } a=RH_f^{ap}$$

R is a triangular matrix, $HS^{ls}_f$ is transfer function(s) for the speakers, and $H^{ap}_f$ is transfer function(s) for the aperture.

Optionally, the processing unit is also configured to obtain an error-microphone output from an error-microphone during an off-line calibration procedure.

Optionally, the sound is from a stationary sound source

Optionally, the sound is from a moving sound source.

An apparatus for providing active noise control, includes: one or more microphones configured to detect sound entering through an aperture of a building structure; a set of speakers configured to provide sound output for cancelling or reducing at least some of the sound; and a processing unit communicatively coupled to the set of speakers, wherein the processing unit is configured to provide control signals to operate the speakers; wherein the processing unit is configured to provide the control signals based on filter weights, and wherein the filter weights are based on an orthonormal set of basis functions.

Optionally, the filter weights are calculated off-line based on the orthonormal set of basis functions.

An apparatus for providing active noise control, includes a processing unit, wherein the processing unit is configured to communicatively couple with: one or more microphones configured to detect sound entering through an aperture of a building structure, and a set of speakers configured to provide sound output for cancelling or reducing at least some of the sound; wherein the processing unit is configured to provide control signals to operate the speakers; and wherein the control signals are independent of an error-microphone output, and/or wherein the processing unit is configured to provide the control signals based on filter weights, the filter weights being based on an orthonormal set of basis functions.

Other features and advantageous will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 10 illustrates a 3D cross-section of an environment with control region.

FIG. 11 illustrates an example of a soundfield being represented as a finite weighted sum of simple waves.

FIGS. 12-15 illustrate attenuation performance in dB.

DETAILED DESCRIPTION

Figure 1A:
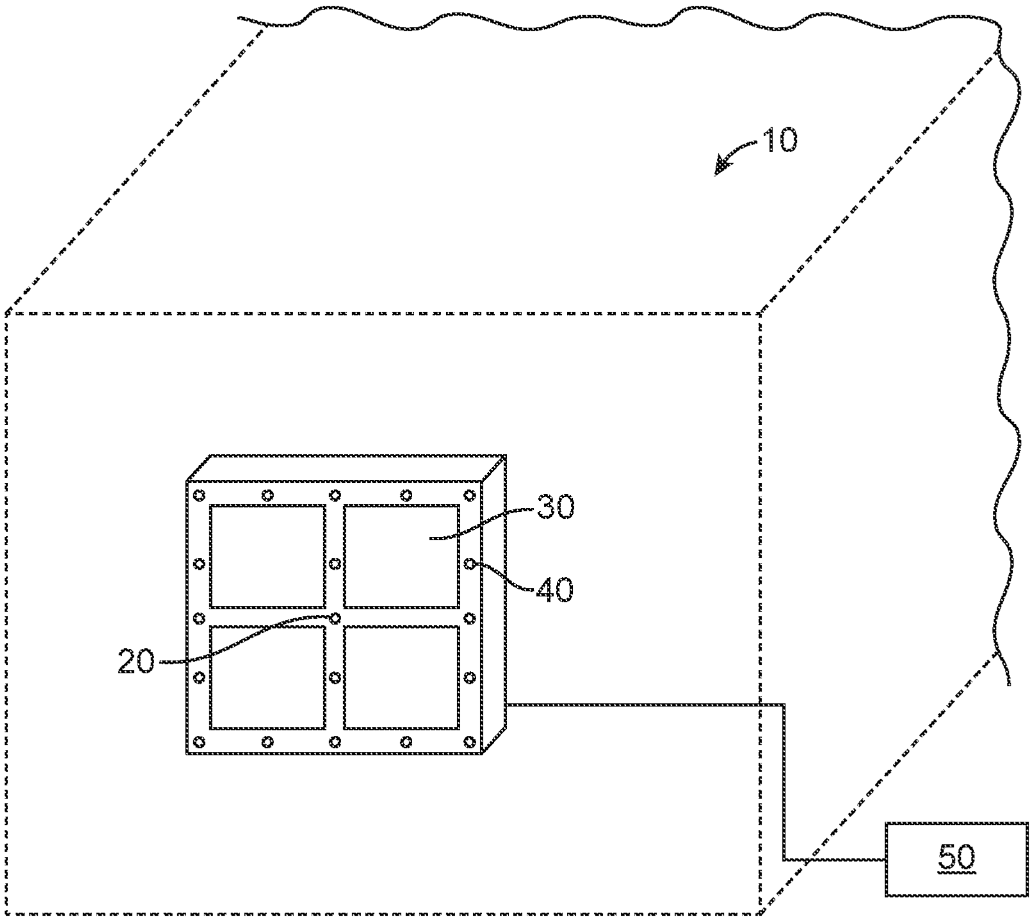
FIG. 1A illustrates an apparatus for providing active noise control for an aperture.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment does not need to have all the aspects or advantages shown. An aspect or an advantage described in conjunction with a particular embodiment is not necessarily limited to that embodiment and can be practiced in any other embodiments even if not so illustrated, or if not so explicitly described.

1. Apparatus

FIG. 1A illustrates an apparatus 10 for providing active noise control in accordance with some embodiments. The apparatus 10 includes a set of one or more microphones 20 configured to detect (e.g., sense, measure, observe, etc.) sound entering through an aperture 30, a set of speakers 40 configured to provide sound output for cancelling or reducing at least some of the sound, and a processing unit 50 communicatively coupled to the set of speakers 40. The aperture 30 may be any aperture of a building structure, such as a window of a room like that shown in the figure. Alternatively, the aperture may be a door of a room, an opening of a fence in an open space, etc. The processing unit 50 is configured to provide control signals to operate the speakers 40, so that the output from the speakers 40 will cancel or reduce at least some of the sound entering through the aperture 30.

The control signals provided by the processing unit 50 may be analog or digital sound signals in some embodiments. In such cases, the sound signals are provided by the processing unit 50 as control signals for causing the speakers to output corresponding acoustic sound for cancelling or at least reducing some of the sound (e.g., noise) entering or entered the aperture 30. In one implementation, the processing unit 50 includes a control unit that provides a sound signal to each speaker 40. The control unit is configured to apply transfer function(s) to the sound observed by the microphone(s) 20 to obtain sound signals, such that when the sound signals are provided to the speakers 40 to cause the speakers 40 to generate corresponding acoustic sound, the acoustic sound from the speakers 40 will together cancel or reduce the sound (e.g., noise) entering or entered the aperture 30.

In the illustrated example, the apparatus 10 has one microphone 20 positioned in the center of the aperture 30 (e.g., at the intersection of a crossbar). In other embodiments, the apparatus 10 may have multiple microphones 20.

It has been discovered that ANC systems for open windows with loudspeakers distributed over the aperture outperform those with loudspeakers placed on the boundary of the aperture. Thus, a compromise between both setups is a sparse array like that shown in FIG. 1A, wherein a cross-bar containing the speakers 40 extends across the aperture 30. In other embodiments, the apparatus 10 may not include the cross-bar, and the speakers 40 may be placed around the boundary of the aperture 30. Also, in other embodiments, the aperture 30 may have different shapes, such as a rectangular shape, a circular shape, an elliptical shape, etc.

In some embodiments, the control signals provided by the processing unit 50 may be independent of an error-microphone output. For example, in some cases, the processing unit 50 may be configured to generate the control signals without using any input from any error-microphone that is positioned in the room downstream from the aperture. In other cases, the processing unit 50 may obtain input from one or more error-microphones positioned in the room downstream from the aperture, and may utilize such input to adjust the control signals to obtain adjusted control signals before them are provided to control the speakers 40.

In some embodiments, the processing unit 50 or another processing unit is configured to determine filter weights for the speakers 40, and wherein the control signals are based on the filter weights. In some cases, the filter weights may be determined offline (i.e., while the apparatus 10 is not performing active noise control). Then, while the apparatus 10 is operating to perform active noise control, the processing unit 50 processes sound entering the aperture "online" based on the filter weights to determine control signals for controlling the speakers 40. The filter weights may be stored in a non-transitory medium accessible by the processing unit 50.

In some embodiments, the filter weights for the speakers 40 are independent of the error-microphone output. For example, in some cases, the processing unit 50 may be configured to determine the filter weights without using any input from any error-microphone that is positioned in the room downstream from the aperture. In other cases, the processing unit 50 may obtain input from one or more error-microphones positioned in the room downstream from the aperture, and may utilize such input to adjust the filter weights to obtain adjusted filter weights for the speakers 40.

In some embodiments, the processing unit 50 is configured to determine the filter weights using an open-loop algorithm. In the open-loop algorithm, the filter weights may be determined by direct calculation without using a closed-loop scheme that repeats the calculation to converge on a solution.

In some embodiments, the processing unit 50 is configured to provide the control signals based on an orthonormal set of basis functions. As used in this specification, when the control signals are described as being "based on" or "using" a function (e.g., a basis function), that means the control signals are generated by a process in which the function, a modified version of the function, and/or a parameter derived from the function, is involved. Accordingly, the control signals may be directly or indirectly based on the function.

In some embodiments, the processing unit 50 is configured to provide the control signals based on inner products between the basis functions in the orthonormal set and acoustic transfer functions of the speakers 40. As used in this specification, when the control signals are described as being "based on" or "using" inner products (e.g., inner products between basis functions in the orthonormal set and acoustic transfer functions of speakers), that means the control signals are generated by a process in which the inner products, a modified version of the inner products, and/or parameter(s) derived from the inner products, are involved. Accordingly, the control signals may be directly or indirectly based on the inner products.

In some embodiments, the processing unit 50 is configured to generate the control signals based on a wave-domain algorithm. As used in this specification, when the control signals are described as being "based on" or "using" an algorithm (e.g., a wave-domain algorithm), that means the control signals are generated by the algorithm, or by a variation of the algorithm that is derived from the algorithm.

In some embodiments, the wave-domain algorithm provides a lower computation cost compared to a least-mean-squares (LMS) algorithm. Also, in some embodiments, the wave-domain algorithm may provide a lower computation cost compared to commercially available algorithms that control speakers for active noise control of sound through an aperture.

In some embodiments, the wave-domain algorithm operates in a temporal frequency domain, and wherein the processing unit 50 is configured to transform signals with Fourier Transform, such as short-time Fourier Transform.

In some embodiments, the short-time Fourier Transform provides a delay, and wherein the apparatus 10 is configured to compensate for the delay using signal prediction and/or placement of the microphones 20. For example, in some embodiments, the processing unit 50 may utilize a model to generate the control signals for operating the speakers 40, wherein the model predicts one or more characteristics of sound entering through the aperture 30. Also, in some embodiments, the microphones 20 may be placed upstream from the aperture 30, so that the processing unit 50 will have sufficient time to process the microphone signals to generate the control signals that operate the speakers 40, in order to cancel or at least reduce some of the sound (entered through the aperture 30) by the speakers' output before the sound exits a control region.

In some embodiments, the building structure may comprise a room, and the aperture is an opening (e.g., window, door, etc.) of the room. In such cases, the processing unit 50 is configured to operate the speakers 40 so that at least some of the sound, or preferably most of the sound, or even more preferably all of the sound, is cancelled or reduced within a region (control region) that is located behind the aperture 30 inside the room. For example, the cancellation or reduction of some of the sound may be a cancellation or reduction in the sound volume in a certain frequency range of the sound. The region may have any arbitrary defined shape. For example, in some embodiments, the region may be a hemisphere, or a partial spherical shape. Also, as another example, the region may be a layer of space extending curvilinearly to form a three-dimensional spatial region. In one implementation, the region may be defined as the space between two hemispherical surfaces with different respective radius. In some embodiments, the control region has a shape and dimension designed to allow the control region to cover all directions of sound entering through the aperture 30 into the room. This allows the apparatus 10 to provide active noise control for the whole room.

In some embodiments, the region covers an entirety of the aperture 30 so that the region intersects sound entering the room through the aperture from all directions.

In some embodiments, the region has a width that is anywhere from 0.5 meter to 3 meters. In other embodiments, the region may have a width that is larger than 3 meters. In further embodiments, the region may have a width that is less than 0.5 meter.

In some embodiments, the region has a volume that is less than: 50%, 40%, 30%, 20%, 10%, 5%, 2%, 1%, etc., of a volume of the room.

In some embodiments, the processing unit 50 is configured to operate based on an algorithm in which the region is defined by a shell having a defined thickness. The thickness may be anywhere from 1 mm to 1 meter. In other embodiments, the thickness may be less than 1 mm or more than 1 meter.

In some embodiments, the shell comprises a partial spherical shell.

In some embodiments, the building structure may comprise a room, and the aperture 30 comprises a window or a door of the room. In other embodiments, the aperture 30 may be a vent, a fireplace, etc.

In some embodiments, the aperture 30 may be any opening of any building structure. For example, the building structure may be an opening of a fence in an open space, and the aperture 30 may be an opening of the fence in the open space.

In some embodiments, the one or more microphones 20 are positioned and/or oriented to detect the sound before the sound enters through the aperture 30.

In some embodiments, the processing unit 50 is configured to provide the control signals to operate the speakers 40 without requiring the error-microphone output from any error-microphone (e.g., inside a room, or in an open space downstream from the aperture and control region).

In some embodiments, the processing unit 50 may be configured to divide the microphone signals from the microphone(s) 20 into time-frequency components (components in both time and frequency), and to process the signal components based on the wave-domain algorithm to obtain noise-cancellation parameters in the different respective frequencies.

In some embodiments, the processing unit 50 may be implemented using hardware, software, or a combination of both. For example, in some embodiments, the processing unit 50 may include one or more processors, such as a signal processor, a general-purpose processor, an ASIC processor, a FPGA processor, etc. Also, in some embodiments, the processing unit 50 may be configured to be physically mounted to a frame around the aperture 30. Alternatively, the processing unit 50 may be implemented in an apparatus that is physically detached from the frame around the aperture 30. In such cases, the apparatus may include a wireless transceiver configured to wirelessly receive microphone signals from the one or more microphones 20, and to wirelessly transmit control signals outputted by the processing unit 50 for reception by the speakers 40, or by a speaker control unit that controls the speakers 40. In further embodiments, the apparatus may be configured to receive microphone signals via a cable from the one or more microphones 20, and to transmit the control signals outputted by the processing unit 50 via the cable or another cable, for reception by the speakers 40 or by a speaker control unit that controls the speakers 40.

In some embodiments, the apparatus 10 may not include the microphone 20 and/or the speakers 40. For example, in some embodiments, the apparatus 10 for providing active noise control may include the processing unit 50, wherein the processing unit 50 is configured to communicatively couple with: a set of microphones 20 configured to detect sound entering through an aperture 30 of a building structure, and a set of speakers 40 configured to provide sound output for cancelling or reducing at least some of the sound; wherein the processing unit 50 is configured to provide control signals to operate the speakers 40. The control signals may be independent of an error-microphone output, and/or the processing unit 50 may be configured to provide the control signals based on an orthonormal set of basis functions.

In some embodiments, the processing unit 50 may optionally be configured to obtain an error-microphone output from an error-microphone during an off-line calibration procedure. The error-microphone may or may not be a part of the apparatus 10. During the off-line calibration procedure, precise microphone parameter(s) and/or speaker parameter(s) (such as, gain, delay, and/or any other parameters that may vary over time) may be measured. As such it may be desirable to periodically perform the off-line calibration procedure to adjust one or more operating parameters of the speakers and/or one or more operating parameters of the microphone(s) based on error-microphone output from an error microphone. The error microphone may be placed anywhere outside the control region and downstream from the control region. After the operating parameters are adjusted during the off-line calibration procedure, the processing unit 50 may then use the adjusted operating parameters in an on-line (e.g., on-line in the sense that current sound is being processed) procedure to perform active noise control of sound entering the aperture 30.

In some embodiments, the error microphone ensures that the wave-domain algorithm performs correctly. For example, if the measurement microphone(s) 20 is accidentally moved, the apparatus 10 may malfunction, and the noise level may be increased rather than reduced. The error microphone may detect such error, and may provide an output for causing the processing unit 50 to deactivate the apparatus 10. As another example, the measurement microphone(s) 20 may deteriorate and may not detect the sound correctly, and/or the speaker(s) 40 may have a degraded speaker output. In such cases, the error microphone may detect the error, and may provide an output for causing the processing unit 50 to automatically correct for that.

2. Method

Figure 1B:
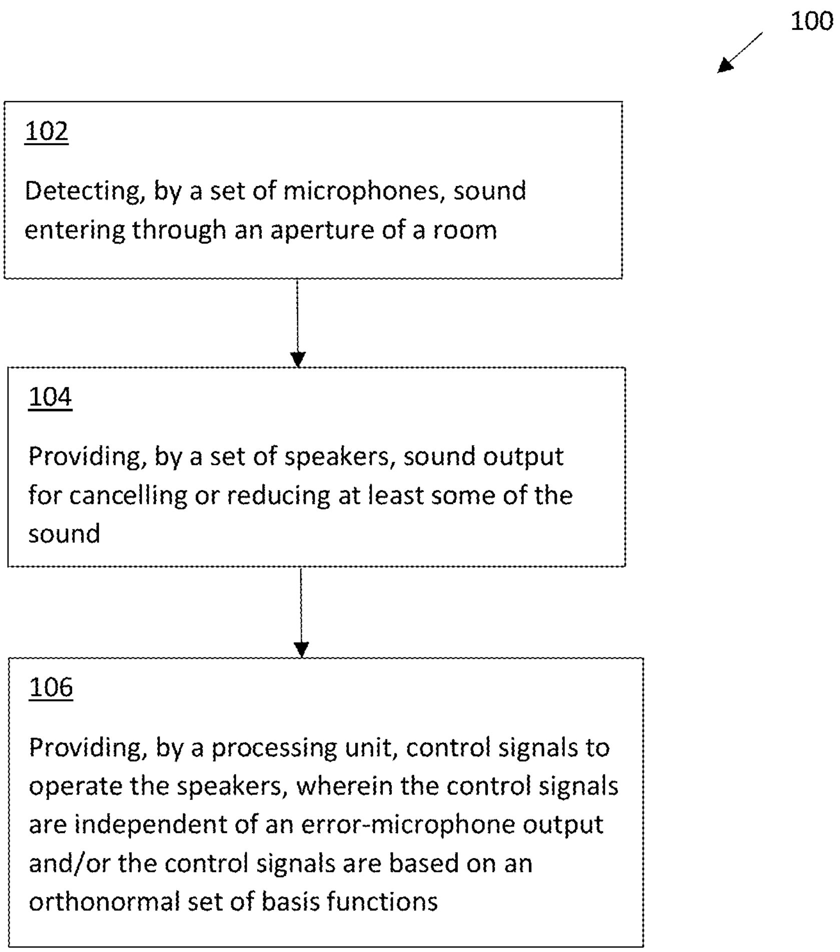
FIG. 1B illustrates a method for providing active noise control for an aperture.

FIG. 1B illustrates a method 100 for providing active noise control, that may be performed by the apparatus 10 of FIG. 1A. The method 100 includes: detecting, by one or more microphones, sound entering through an aperture of a building structure (item 102); providing, by a set of speakers, sound output for cancelling or reducing at least some of the sound (item 104); and providing, by a processing unit, control signals to operate the speakers, wherein the control signals are independent of an error-microphone output and/or the control signals are based on an orthonormal set of basis functions. (item 106).

Optionally, the method 100 further comprises obtaining filter weights for the speakers, wherein the control signals are based on the filter weights. In some embodiments, the act of obtaining the filter weights may comprise retrieving filter weights from a non-transitory medium. In other embodiments, the act of obtaining the filter weights may comprise calculating the filter weights. The filter weights may be determined by the processing unit 50 or by another processing unit. In some cases, the filter weights may be determined offline (i.e., while the apparatus 10 is not performing active noise control). Then, while the apparatus 10 is operating to perform active noise control, the processing unit 50 processes sound entering the aperture "online" based on the filter weights to determine control signals for controlling the speakers 40. The filter weights may be stored in a non-transitory medium accessible by the processing unit 50.

Optionally, in the method 100, the filter weights for the speakers are independent of the error-microphone output.

Optionally, in the method 100, the filter weights are based on (e.g., determined using) an open-loop algorithm.

Optionally, in the method 100, the filter weights for the speakers are determined off-line.

Optionally, in the method 100, the filter weights are based on an orthonormal set of basis functions.

Optionally, in the method 100, the filter weights are based on inner products between the basis functions in the orthonormal set and acoustic transfer functions of the speakers.

Optionally, in the method 100, the filter weights are based on a wave-domain algorithm.

Optionally, in the method 100, the wave-domain algorithm provides a lower computation cost compared to a least-mean-squares (LMS) algorithm.

Optionally, in the method 100, the wave-domain algorithm operates in a temporal frequency domain, and wherein the method 100 further comprises transforming signals with short-time Fourier Transform.

Optionally, in the method 100, the short-time Fourier Transform provides a delay, and wherein the method 100 further comprises compensating for the delay using signal prediction and/or placement of the one or more microphones.

Optionally, in the method 100, the building structure comprises a room, wherein the speakers are operated by the processing unit so that at least some of the sound is cancelled or reduced within a region that is located behind the aperture inside the room.

Optionally, in the method 100, the region covers an entirety of the aperture so that the region intersects sound entering the room through the aperture from all directions.

Optionally, in the method 100, the region has a width that is anywhere from 0.5 meter to 3 meters.

Optionally, in the method 100, the region has a volume that is less than 10% of a volume of the room.

Optionally, in the method 100, the processing unit operates based on an algorithm in which the region is defined by a shell having a defined thickness.

Optionally, in the method 100, the shell comprises a partial spherical shell.

Optionally, in the method 100, the aperture comprises a window or a door of the room.

Optionally, in the method 100, the building structure comprises a fence in an open space, and the aperture is an opening of the fence in the open space.

Optionally, in the method 100, the one or more microphones are positioned and/or oriented to detect the sound before the sound enters through the aperture.

Optionally, in the method 100, the control signals are provided by the processing unit to operate the speakers without requiring the error-microphone output from any error-microphone.

Optionally, the method 100 further includes obtaining filter weights for the speakers, the filter weights being based on transfer function(s) for the aperture modeled as:

$$H^{ap}(x, k, \theta_0, \phi_0) = \frac{jck\rho 0}{2\pi}\omega_0 \Delta L_x \Delta L_y \sum_{i=1}^{\hat{P}} D_i$$

where x is a position, k is a wave number, $(\theta_0, \varphi_0)$ is incident angle of a plane wave representing noise, j is an imaginary number, c is the speed of sound, $w'_0$ is a gain constant, $\Delta L_x$ and $\Delta L_y$ are aperture section dimensions and $P^{\wedge}$ is a number of aperture sections, and $D_i$ is a directivity.

Optionally, the method 100 further includes obtaining filter weights for the speakers, the filter weights being based on a matrix C and a matrix a, wherein:

$$C=RH_f^{ls} \text{ and } a=RH_f^{ap}$$

R is a triangular matrix, $H^{ls}_f$ is transfer function(s) for the speakers, and $H^{ap}_f$ is transfer function(s) for the aperture.

Optionally, in the method 100, the sound is from a stationary sound source.

Optionally, in the method 100, the sound is from a moving sound source.

Optionally, the method 100 further includes obtaining an error-microphone output from an error-microphone during an off-line calibration procedure. During the off-line calibration procedure, precise microphone parameter(s) and/or speaker parameter(s) (such as, gain, delay, and/or any other parameters that may vary over time) may be measured. As such it may be desirable to periodically perform the off-line calibration procedure to adjust one or more operating parameters of the speakers and/or one or more operating parameters of the microphone(s) based on error-microphone output from an error microphone. The error microphone may be placed anywhere outside the control region and downstream from the control region. After the operating parameters are adjusted during the off-line calibration procedure, the processing unit 50 may then use the adjusted operating parameters in an on-line (e.g., on-line in the sense that current sound is being processed) procedure to perform active noise control of sound entering the aperture 30.

3. Background of the Wave-Domain Algorithm

In some embodiments, the processing unit 50 of the apparatus 10 is configured to generate control signals for operating the speakers 40 based on an open-loop wave-domain algorithm. One objective of such algorithm is to ensure global attenuation of noise propagating through the aperture 30. The algorithm is designed to achieve cancellation in the far-field (e.g., r>0:8 m). The energy behind a finite control region is minimized if a wavefront, with minimized sound energy, is created in that control region. The aim of the algorithm is to generate such a wavefront in the control region.

In the following discussion, k is the wave number (and it may have any value, such as k=2πf/c), $j=-1^{0.5}$ is the imaginary number, the unnormalized sinc function is used and $[\bullet]^H$ and ||.|| are the conjugate transpose and the Euclidean norm, respectively. Spherical coordinates are used with radius r, inclination θ and azimuth φ and corresponding Cartesian coordinates x=r sin θ cos φ, y=r sin θ sin φ and z=r cos θ.

In formulating the wave-domain algorithm for the processing unit 50, the noise is assumed to be a plane wave, with fixed incident angle ($\theta_0$, $\varphi_0$). Wavefronts may be described as a sum of plane waves, and hence, the following formulation applies. Then, the aperture may be modeled as a sum of square baffled pistons in an infinitely large wall with an ATF. Such an ATF relates the pressure of the plane wave with the pressure of the soundfield at position x in the room. The equation, for 3D modeling, is derived from as:

$$H^{ap}(x, k, \theta_0, \phi_0) = \frac{jck\rho 0}{2\pi}\hat{\omega}_0 \Delta L_x \Delta L_y \sum_{i=1}^{\hat{P}} D_i, \tag{1}$$

where c is the speed of sound, $w\hat{}_0$ is a gain constant, $\Delta L_x$ and $\Delta L_y$ are aperture section dimensions and P^ is the number of aperture sections. $D_i$ is the directivity, of each piston, defined as:

$$D_i = \frac{e^{-jk(r_i+\tau_i)}}{r_i}\mathrm{sinc}\left(\frac{\Delta L_x k(\sin\theta_i\cos\phi_i - \sin\theta_0\cos\phi_0)}{2}\right) \mathrm{sinc}\left(\frac{\Delta L_y k(\sin\theta_i\sin\phi_i - \sin\theta_0\sin\phi_0)}{2}\right), \tag{2}$$

where, for section i, $r_i$, $\theta_i$ and $\varphi_i$ are the adjusted spherical coordinates and $\tau_i$ is a delay term due to the incident angle of the plane wave. Modeling in 2D is done by removing the height $\Delta L_x$, omitting the sinc function in the x direction, and setting x=0.

Furthermore, when formulating the wave-domain algorithm for the processing unit 50, the ATFs of Q number of loudspeakers may be modeled as monopoles:

$$H_q^{ls}(x, k) = \frac{jck\rho 0}{4\pi}A_q\frac{e^{-jkr_q}}{r_q}, \tag{3}$$

in which $A_q=4\pi a^2_{point}u_0$ is each monopole's amplitude, with $u_0$ a surface velocity gain constant, $a_{point}$ the radius of the point source and $r_q$ the adjusted spherical radius from a monopole to a position x in the room. To model a particular real-world loudspeaker, equation (3) may be replaced with an appropriate ATF. The soundfield from the loudspeaker array is the sum of multiple loudspeaker soundfields. The loudspeaker ATF in (3), holds in 2D and 3D.

3-1 Modeling of Environment

Figure 2:
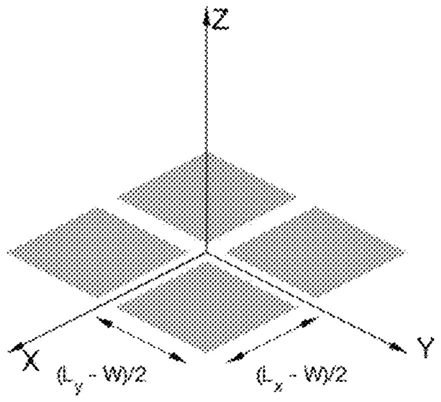
FIG. 2 illustrates a schematic of an aperture.

For 3D modeling of the environment, the physical properties of the aperture may be considered. FIG. 2 shows a graphical representation of the aperture being modeled, and has the following dimensions: the height and width are Lx and Ly, respectively, and the crossbar has a width of W+.

The open-loop wave-domain algorithm may use one or more reference microphones. It is assumed that the reference microphone has an ideal frequency response, and only one microphone is enough for modeling the incoming noise. The microphone is positioned at the origin ((x, y, z)=(0, 0, 0)), in the middle of the aperture. Furthermore, it is assumed that the incident angle of the plane wave, denoted with $\theta_0$ and $\phi_0$, of the incoming primary noise plane wave, is known a priori. Methods for calculating this angle based on microphone arrays are already available and will not be covered here.

Figure 3A:
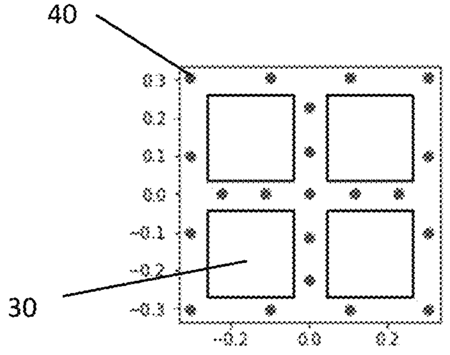
FIG. 3A illustrates an example of placement of speakers.
Figure 3B:
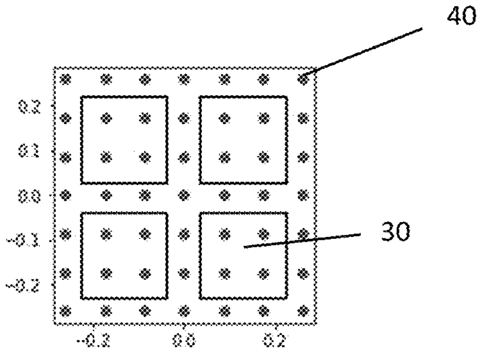
FIG. 3B illustrates an example of a grid array.

In addition to the reference microphone, the speaker array is modeled. FIG. 3A illustrates an example of a sparse array containing 21 speakers (e.g., loudspeakers) that may be modeled, wherein the speakers are sparsely positioned on the crossbar and aperture boundaries. FIG. 3B illustrates an example of a grid array having 49 speakers (e.g., loudspeakers) that may be modeled, wherein the speakers are distributed over the entire aperture. It is also assumed that the speakers have a flat frequency response.

In some cases, as an alternative to the 3D modeling of the environment, a 2D simplification may be used. The computational effort of a 2D model is much lower compared to 3D. This gives the opportunity to quickly iterate and test algorithms before applying them in the 3D environment.

Figure 4A:
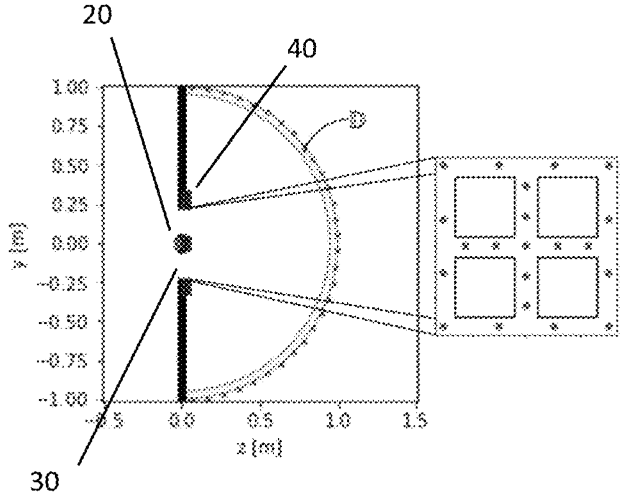
FIG. 4A illustrates an example of a 2D simulation environment.
Figure 4B:
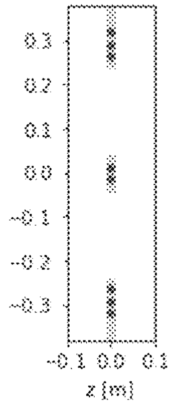
FIG. 4B illustrates an example of an 8-speakers arrangement in a 2D scheme.
Figure 4C:
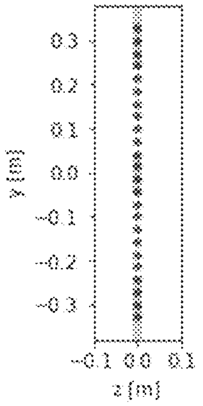
FIG. 4C illustrates an example of a 24-speakers arrangement in a 2D scheme.

The 2D modeling may be implemented as a cross-section of the 3D aperture. For example, one may remove the height and model only in (z, y) coordinates. The aperture entails a Ly wide opening, containing a crossbar in the middle, with width set as W+. A schematic overview is shown in FIG. 4A. Similar to the 3D model, a reference microphone may be placed at the origin (e.g., in the center of the crossbar) and perfect calibration is assumed. The control region D is also illustrated. The control region D is located inside the room behind the aperture, and is covering an entirety of the aperture. Thus, the control region D is downstream from the aperture and speakers. In FIG. 4A, the vertical solid line represents a boundary of a building structure with the aperture, and sound is entering the aperture from the left side. The control region D is behind the aperture and is inside a room. Similar to the 3D model, the 2D model may model different types of speaker array. For example, the sparse array may contain 8 speakers, divided over the boundaries and crossbar, as can be seen in FIG. 4B. The grid array may be modeled as a row of 24 loudspeakers over the whole width of the aperture, shown in FIG. 4C.

As shown in FIG. 4A, for evaluation of the wave-domain algorithm, evaluation microphones may be positioned at an arc, shown as dots in FIG. 4A. The function of the evaluation microphones is to measure the sound pressure from the aperture in all directions, both when a wave-domain algorithm is active, and when it is not active. In some cases, the evaluation microphones may be distributed evenly over a hemisphere surrounding the aperture, such that sound energy can be measured in all directions from the aperture into the room.

3-2 Acoustic Transfer Functions

The modeling of the environment may employ multiple ATFs. These are used in parallel to describe what happens when a wave propagates from outside through the aperture into the room, as well as the waves from the loudspeakers. The aperture ATF and loudspeaker ATF are discussed below.

3-2-1 Aperture ATF

To model the aperture, we seek an ATF that relates the pressure of the plane wave signal in the aperture with the pressure at an arbitrary evaluation position in the room. In some cases, the aperture may be modeled as a vibrating plate in an infinitely large wall. The ATF of a single square vibrating plate is given as:

$$H^{ap}(x,k,\theta_0,\phi_0)=\frac{jck\rho 0}{2\pi}\dot{\omega}_0 L_x L_y\frac{e^{-jkr}}{r_i}\mathrm{sinc}\left(\frac{L_xk(\sin\theta\cos\phi-\sin\theta_0\cos\phi_0)}{2}\right)\mathrm{sinc}\left(\frac{L_yk(\sin\theta\sin\phi-\sin\theta_0\sin\phi_0)}{2}\right),\tag{3-1}$$

where j is the imaginary number, c is the speed of sound, k is the wavenumber, $\rho_0$ is the density of air, $\omega^{\cdot}$ 0 is a gain constant, $L_x$ and $L_y$ denote the aperture dimensions, x=(r, θ, ϕ)=(x, y, z) describes the position at which we calculate the pressure and $\theta_0$ and $\phi_0$ indicate the incident angle of the primary noise. In order to model the cross-bar in the aperture, Eq. (3-1) is extended to a stack of four vibrating plates with a single origin. This gives:

$$\begin{aligned}H^{ap}(x,k,\theta_0,\phi_0)={}&\frac{jck\rho_0}{2\pi}\dot{\omega}_0\frac{e^{-jkr}}{r}\Bigg(L_xL_y\,sinc\left(\frac{L_xk(\sin\theta\cos\phi-\sin\theta_0\cos\phi_0)}{2}\right)\\&sinc\left(\frac{L_yk(\sin\theta\sin\phi-\sin\theta_0\sin\phi_0)}{2}\right)-L_xW_+\\&sinc\left(\frac{L_xk(\sin\theta\cos\phi-\sin\theta_0\cos\phi_0)}{2}\right)sinc\left(\frac{W_+k(\sin\theta\sin\phi-\sin\theta_0\sin\phi_0)}{2}\right)-\\&L_yW_+sinc\left(\frac{L_yk(\sin\theta\cos\phi-\sin\theta_0\cos\phi_0)}{2}\right)\\&sinc\left(\frac{W_+k(\sin\theta\sin\phi-\sin\theta_0\sin\phi_0)}{2}\right)+W_+^2\\&sinc\left(\frac{W_+k(\sin\theta\sin\phi-\sin\theta_0\sin\phi_0)}{2}\right)sinc\left(\frac{W_+k(\sin\theta\sin\phi-\sin\theta_0\sin\phi_0)}{2}\right)\Bigg),\end{aligned}\tag{3-2}$$

where W+ is the crossbar width. This equation is valid in the far-field. However, if we have aperture dimensions of, e.g. $L_x=L_y=0.5$ m, the far-field at 2000 Hz starts at $r>>kL^2=2\pi fL^2/c=2\pi\cdot2000\cdot0.5^2/343=9.2$ m (note that the location where far-field starts is an approximation, and therefore ">>" is used in the formula). This is too far from the aperture for our application. We seek an approach that accurately describes the wave from approximately 1 m from the aperture onwards. Hence, we elaborate further and develop the following aperture ATF. The method is extended by summing a multitude of smaller vibrating plates. With this approach, what happens when a wave propagates through an aperture may be modeled. It describes the soundfield by an aperture with a crossbar more accurately at closer distances. This allows the algorithm to be implemented in the processing unit 50. So, we express the pressure at evaluation position ($x=(x_e, y_e, z_e)$) as a sum of the pressures by P^square vibrating plates. The equation for 3D modeling is then derived as:

$$H^{ap}(x,k,\theta_0,\phi_0)=\frac{jck\rho_0}{2\pi}\dot{\omega}_0\Delta L_x\Delta L_y\sum_{i=1}^{\hat{P}}D_i,\tag{3-3}$$

where $\Delta L_x$ and $\Delta L_y$ are aperture section dimensions. Di is the directivity, of each plate, defined as:

$$D_i=\frac{e^{-jk(r_i+\tau_i)}}{r_i}sinc\left(\frac{\Delta L_xk(\sin\theta_i\cos\phi_i-\sin\theta_0\cos\phi_0)}{2}\right)sinc\left(\frac{\Delta L_yk(\sin\theta_i\sin\phi_i-\sin\theta_0\sin\phi_0)}{2}\right),\tag{3-4}$$

where, for section i, $r_i$, $\theta_i$ and $\phi_i$ are the adjusted spherical coordinates and $\tau_i$ is a delay term due to the incident angle of the plane wave. We define the coordinates as:

$$r_i=\sqrt{(x_e-x_i)^2+(y_e-y_i)^2+z_i^2},\tag{3-5}$$

$$\theta_i=\arccos(z_i/r_i),\tag{3-6}$$

$$\phi_i=\mathrm{atan2}((y_e-y_i),(x_e-x_i)),\tag{3-7}$$

where ($x_i$, $y_i$, $z_i$) denotes the origin of section i. Furthermore, the delay term is calculated as the perpendicular distance between the plane of the plane wave in the origin of the aperture, and the origin of section i. It is defined as:

$$\tau_i=\frac{\sin(\theta_0)\cos(\phi_0)x_i+\sin(\theta_0)\sin(\phi_0)y_i}{\sqrt{(\sin(\theta_0)\cos(\phi_0))^2+(\sin(\theta_0)\sin(\phi_0))^2+(\cos(\theta_0))^2}},\tag{3-8}$$

and it makes sure that section i has the correct phase shift resulting from the incident angle of the incoming noise.

As illustrated, equation 3-3 describes the wave-propagation or acoustic behavior of sound traveling through an aperture by modeling such characteristic using multiple vibrating plates, which is believed to be novel and unconventional.

Modeling in 2D is done by removing the height $\Delta L_x$ and emitting the sinc function of the x direction. Essentially, this describes an infinitely thin window. The transfer function of 3D, in Eq. (3-3), reduces to:

$$H^{ap}(x,k,\theta_0,\phi_0)=\frac{jck\rho_0}{2\pi}\dot{\omega}_0\Delta L_y\sum_{i=1}^{\hat{P}}D_i,\tag{3-9}$$

and the directivity from Eq. (3-4) is downsized to:

$$D_i=\frac{e^{-jk(r_i+\tau_i)}}{r_i}sinc\left(\frac{L_yk(\sin\theta_i\sin\phi_i-\sin\theta_0\sin\phi_0)}{2}\right),\tag{3-10}$$

and the adjusted coordinates can be expressed as:

$$r_i=\sqrt{(y_e-y_i)^2+z_i^2},\tag{3-11}$$

$$\theta_i=\arccos(z_i/r_i),\tag{3-12}$$

$$\phi_i=\mathrm{atan2}((y_e-y_i),0),\tag{3-13}$$

and the delay-term ends up being:

$$\tau_i = \frac{\sin(\theta_0)\sin(\phi_0)y_i}{\sqrt{(\sin(\theta_0)\sin(\phi_0))^2 + (\cos(\theta_0))^2}}. \tag{3-14}$$

3-2-2 Loudspeaker ATF

Similar to the aperture ATF, the loudspeaker ATF that relates the sound pressure at an evaluation position to the loudspeaker signal may be determined. Here, this is achieved by modeling the loudspeaker ATF as a monopole. Other loudspeaker models may be used similarly in other embodiments. Accordingly, the pressure at position x from the loudspeaker array is a sum of each individual loudspeaker. A monopole is modeled as:

$$H_q^{ls}(x, k) = \frac{jck\rho_0}{4\pi} A_q \frac{e^{-jkr_q}}{r_q}, \tag{3-15}$$

in which $A_q=4\pi a^2 u_0$ is the monopole amplitude, with $u_0$ a surface velocity gain constant and a the radius of the monopole. Furthermore, $r_q$ is the adjusted spherical radius from the monopole to a position x in the room, defined as:

$$r_q=\sqrt{(x_e-x_q)^2+(y_e-y_q)^2+z_q^2}, \tag{3-16}$$

where $(x_q, y_q, z_q)$ denotes the position of the loudspeaker. This ATF holds in 3D, and for 2D we set $x_q=0$.

3-3 Block Processing

An element-wise multiplication of the ATF with a STFT block may be employed to transform signals, from the aperture and loudspeakers, to any position the room. For example, an arbitrary input signal (x(n)) may be transformed to the wave-domain with the Short-time Fourier Transform (STFT). For the STFT, the window-function, w(n) of length N is chosen to fulfil $$\sum_{m\in\mathbb{Z}} \omega(n-mH)^2=1$$

where n is the discrete time index, m is hop-number and H is the hop-size. This ensures a tight frame with good reconstruction. The circularity property of the STFT leads to wrapping of the signals, if phase-shifts by ATFs become significant compared to the window-size. Employing zero-padding can reduce this issue, however, it emits the shifted signal content. This issue may be addressed by removing the major time shift from the wave-domain multiplication and implementing it in the time-domain.

The block-processing with STFT in the wave-domain approach induces an algorithmic delay. The window-size N determines the length of the delay. Compensating for this can either be done by placing the reference microphone at a distance of at least $cN/f_s$ in front of the aperture, or, by predicting the noise signal.

3-3-1 Implementation

The signal is broken into M blocks $(x_m(n))$ using an analysis window function w(n), of length N samples and the Discrete Fourier Transform (DFT) may be applied to each block. The window-function, w(n) is chosen to fulfill $\Sigma_{m\in Z} w(n-mH)^2=1$. Let's denote the coefficient vector containing frequency information of the m-th block as:

$$X_m(k)=\mathrm{STFT}(x_m(n)). \tag{3-17}$$

Thereafter, we do an element-wise multiplication of the coefficient vector with an ATF H(k):

$$\hat{X}_m(k)=X_m(k)\odot H(k). \tag{3-18}$$

Finally, the transformed signal x^(n) can be obtained with the Inverse Short-time Fourier Transform (I-STFT):

$$\hat{x}(n)=I\text{-}\mathrm{STFT}(\hat{X}_m(k)). \tag{3-19}$$

3-3-2 Time-Delay Wrapping

Figure 5:
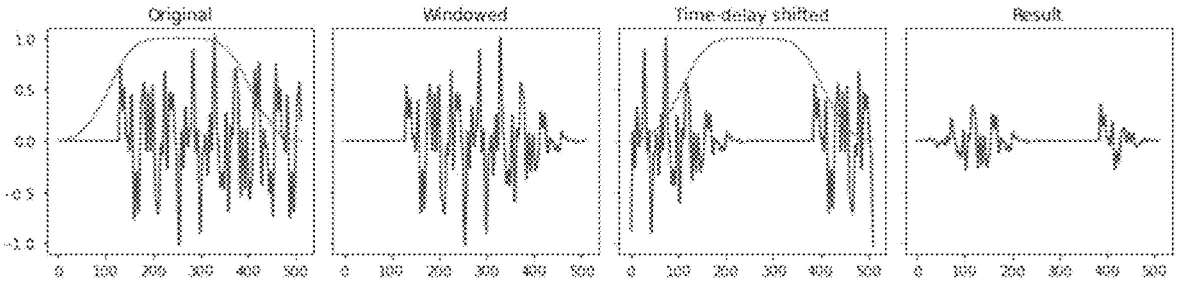
FIG. 5 illustrates an example of time delay wrapping.

The block-processing, elaborated in the prior section, has a limiting artifact. When phaseshifts by ATFs become significant compared to the window length, the circularity property of the STFT, assuming that $x_m(n)$ is periodic, causes wrapping of the signals. That means that a positive time-delay shifts the signal such that the last part (in time), appears at the beginning of the block. This may cause the block processing approach to induce errors in the transformed signals. An illustration is shown in FIG. 5. In particular, FIG. 5 shows the time delay wrapping issue that occurs when long delays are implemented with short STFT blocks. Due to the periodicity assumption of the Fourier transform, the time-delay shift causes the end of the signal block to wrap to the beginning of the block, visible when taking the following steps. The original signal (1) is windowed to obtain a windowed signal (2). Then, the signal is transformed to the frequency-domain, a time-delay is applied and transformed back to the time-domain (3). Finally, the window is applied again, resulting in a wrapped signal (4). Deploying zero-padding can reduce this issue. However, this emits the shifted signal content that would otherwise appear at the beginning of the block. Omitting this signal part may lead to a loss of signal, limiting the accuracy of the block processing. In this section, a technique to reduce this issue significantly is discussed.

In some ATFs, like Eq. (3-3), Eq. (3-9) and Eq. (3-15), the time-delay is encapsulated in the $e^{-jkr}$ term, where r is a distance. The wave propagates over this distance with the speed of sound c, leading to a time-delay. To overcome the issue of wrapping, we apply the most significant part of the time-delay in the time-domain. Let us define the procedure for a simplified ATF, defined as:

$$H=Ae^{-jkr_{delay}}. \tag{3-20}$$

where A is any other part of the ATF that does not include the phase-shift and k is the wavenumber. We calculate the total delay in samples:

$$T_{total} = \frac{f_s r_{delay}}{c}, \tag{3-21}$$

where $f_s$ is the sample rate and c the speed of sound. However, $T_{total}$ is often not an integer, and in the discrete time-domain, we can only shift signals by integer steps. Hence, we divide the total delay between an integer and a decimal term:

$$T_{total}=\hat{T}_{int}+\tilde{T}_{dec}, \tag{3-22}$$

where the integer term is defined as:

$$\hat{T}_{int}=\lfloor T_{total} \rceil, \tag{3-23}$$

where [•] is rounding to the next integer. We retrieve the adjusted ATF as:

$$\hat{H}(k)=e^{-jkc\tilde{T}_{dec}/f_s}, \tag{3-24}$$

and plug this, together with the integer time shift, in Eq. (3-18). Then, a non-wrapping, time-shifted block processing procedure for this ATF may be achieved as:

$$\hat{x}(n+\hat{T}_{int})=I\text{-}\mathrm{STFT}(X_m(k)\odot e^{-jkc\tilde{T}_{dec}/f_s}). \tag{3-25}$$

3-3-3 Window-Size and Frequency Resolution

Aside from the time-delay wrapping that influences the accuracy of block-processing with the STFT, another limitation arises due to the blockwise processing. As the STFT uses the DFT, we work with a sampled frequency response. That means that we sample the continuous ATFs given in Eq. (3-3) and Eq. (3-15). When sampling, aliasing can occur. The application of the ATF in the discrete wave-domain is the root of the problem. The ATF is a continuous function. However, it is applied in a discrete sense. This means that we sample the frequency response of the ATF. Similarly to the sampling of signals in the time-domain, aliasing occurs when sampling is performed in the wave-domain. More specifically, when sampling, part of the behavior that happens 'in between' the sampled points is disregarded: the sample is the average of that measured section of the signal. With a shorter STFT window-size N, we have fewer discrete frequency bins, leading to a lower frequency resolution. Similar to sampling in the time-domain, sampling in frequency with fewer frequency bins means that only smooth behavior of the frequency response is captured. Let us look at an example of the frequency response of the aperture ATF, evaluated at a point in the room. The frequency response with high frequency resolution, with $N=f_s$ (close to the continuous case) is compared with the low frequency resolution version, with N=16 samples.

Figure 6A:
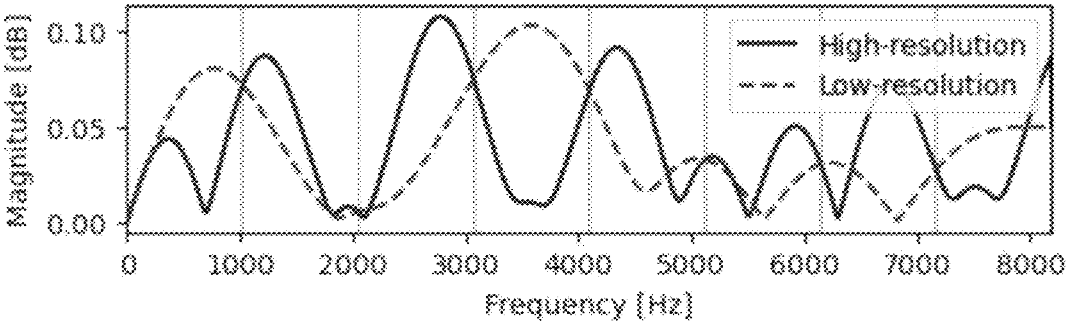
FIG. 6A is a magnitude plot of aperture ATF frequency responses for high and low-resolution scenarios.
Figure 6B:
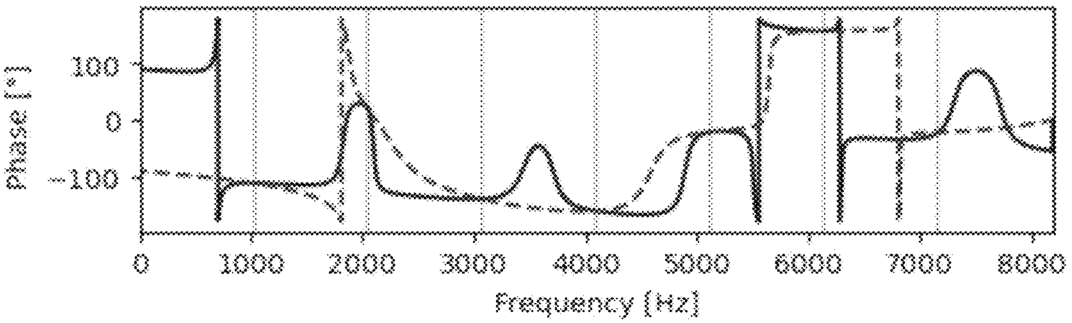
FIG. 6B is a phase plot of aperture ATF frequency responses for high and low-resolution scenarios.
Figure 7:
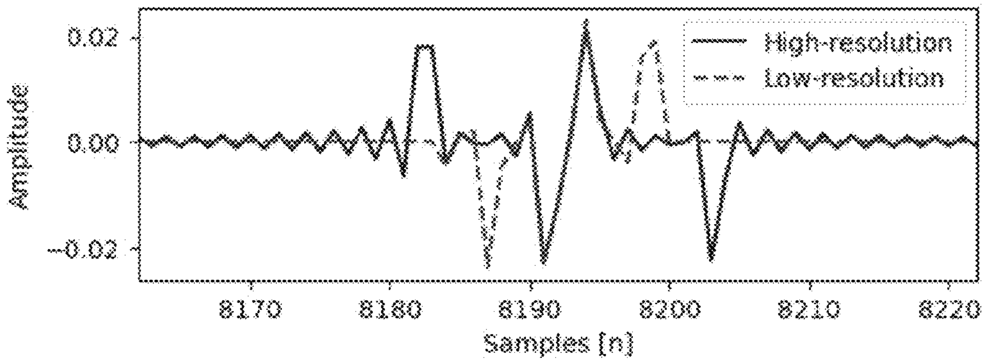
FIG. 7 illustrates an impulse response of an aperture ATF, wherein the solid line shows the original impulse response, and the dashed line shows the filtered case.

FIGS. 6A-6B show the relatively non-smooth ATF frequency response in solid line (corresponds with high resolution). The vertical lines indicate the frequency bins that correspond to the forward-STFT for a block size of N=16 samples. The dashed line corresponds to the low-resolution frequency response of the aperture transfer function. The low-resolution (dashed) line shows a smoothened version and corresponds with the high resolution version at the grey lines, that indicate the frequency bins. In this short window-size case, the impulse response of the higher solution is windowed drastically. The dashed line in FIG. 7 shows the windowed impulse response (where a rectangular window is applied due to the low frequency resolution), and the solid line shows the original impulse response. It becomes clear that the low resolution results in an error, as the two impulse responses do not overlap.

An analytical method may be derived to calculate the error caused by approximating an ATF with low resolution. Let us denote the wave-domain variables in bold and time-domain variables in normal font. We start with a frequency weighting, which weights certain frequency content based on the primary noise signals. We denote this by: s(k): R→R. This frequency weighting is the average power spectral density of a certain audio set. We use a perfectly flat frequency response weighting, so s(k)=1 ∀k. Furthermore, y(k) and y^(k) denote a weighted frequency response of ATF and it's approximated (lower frequency resolution) version, respectively. The arbitrary transfer function is denoted as h(k). Finally, the low 'time' filter, corresponding to the window-size is defined in the time-domain as a rectangular window:

$$w(t)=\begin{cases}1, & -\frac{N}{2}\leq t\leq\frac{N}{2},\\ 0, & \text{elsewhere,}\end{cases} \tag{3-26}$$

where N is the window-size and its wave-domain equivalent is defined as w(k)=N sinc(ckN), as the Fourier Transform of a rectangular window is a sinc-function.

The error in wave-domain e(k) is derived as follows. We begin with the weighted frequency response:

$$y(k)=h(k)s(k) \tag{3-27}$$

and use it to describe the filtered frequency response:

$$\hat{y}(k)=w(k)*y(k)=w(k)*(h(k)s(k)). \tag{3-28}$$

The filtering in the time-domain, a multiplication of the weighted impulse response with the filter, corresponds to a linear convolution between the weighted frequency response and the frequency transformation of the filter in the frequency domain. y(k) and y^(k) are used as ATFs the simulation model. Finally, the frequency response error is the difference between the two frequency responses:

$$\begin{aligned}e(k)&=y(k)-\hat{y}(k)\\&=h(k)s(k)-w(k)*(h(k)s(k))\\&=(1-w(k))*(h(k)s(k)).\end{aligned} \tag{3-29}$$

Figure 8:
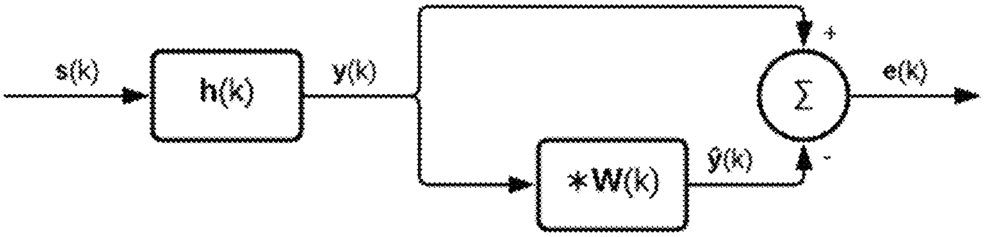
FIG. 8 illustrates an example of an algorithm for error analysis.

The method is summarized with a block diagram in FIG. 8. In particular, FIG. 8 illustrates the schematic overview of the error analysis procedure with frequency weighting h(k), weighted frequency response y(k), it's low frequency resolution version y^(k) and the error e(k). The * denotes convolution.

From this, we can calculate the Signal-to-Noise Ratio (SNR) between the frequency response error and the weighted frequency response, or, equivalently by Parseval's theorem, the ratio between the weighted impulse response and the error impulse response:

$$SNR=10\log_{10}\left(\frac{\sum(y(k))^2}{\sum(e(k))^2}\right)=10\log_{10}\left(\frac{\sum(y(t))^2}{\sum(e(t))^2}\right), \tag{3-30}$$

in dB. The resulting SNR describes how well the approximated weighted frequency response y^(k) described the actual weighted frequency response y(k). This may provide the fundamental performance limit of using the approximated weighted frequency response for frequency weight calculation.

3-4 Schematic Overview

Figure 9:
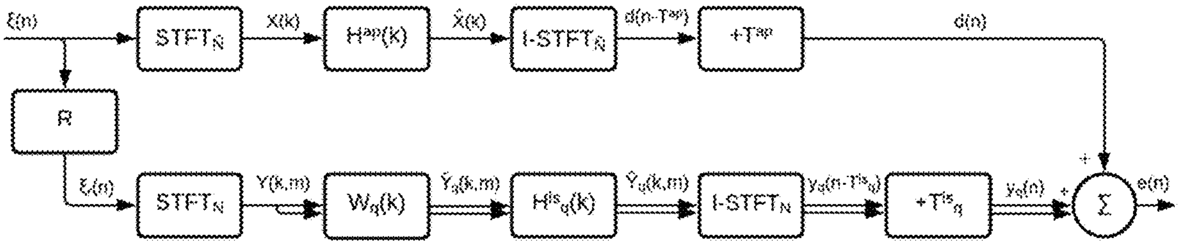
FIG. 9 illustrates a block diagram illustrating features of a controller.

FIG. 9 is a schematic overview of an exemplary technique to determine a result of an active noise control at a single evaluation position in the room. The primary noise ((n)) takes the primary path via the aperture ATF $H^{ap}$(k). Here, a STFT with a very large window-size ($N^{-}=f_s$) is used, for high frequency resolution. After transforming back to time, the time-delay $T_{ap}$ (that was split from the frequency implementation) may be implemented. Eventually, the primary noise signal at the evaluation position (d(n)) is obtained. In the secondary path, the primary noise signal is measured by reference microphone R. The measured signal is transformed to the wave-domain with a STFT with window-size N. Then, for each loudspeaker q, the signal is transformed with its corresponding filter weight $W_q$(k). The calculation of this weight will be discussed. Next, each adjusted loudspeaker signal is multiplied with the corresponding ATF of the loudspeaker $H^{ls}_q$(k) and transformed back to time-domain with an I-STFT. The time-delay that was omitted from the loudspeaker ATF may be implemented. In the end, the signals of the aperture (d(n)) and from all loudspeakers ($y_q$(n)) are summed, and the error in the evaluation position e(n) is obtained.

4. Wave-Domain Algorithm

Exemplary equations for calculating speaker filter-weights that minimize, or at least reduce, the soundfield of the aperture will now be discussed. In some embodiments, the processing unit 50 of the apparatus 10 may be configured to determine the filter-weights based on one or more of the equations and/or one or more parameters described herein. To illustrate the design of the wave-domain algorithm, the control region is first discussed in Section 4-1, which is the spatial region in which the sound energy is to be minimized or reduced. The wave-domain algorithm is based on such control region. Thereafter, in Section 4-2, the algorithm will be discussed with reference to basis functions. In Section 4-3, the number of basis functions that may be utilized by the processing unit 50 is discussed.

4-1 Control Region

The wave-domain algorithm rests on the principle of minimizing the sum of soundfields in a spatial control region. In some embodiments, this spatial control region may be located behind the aperture, and is only a subset of the total volume of the room. By minimizing or at least reducing sound coming through the aperture in the control region, it can be assured that the region beyond the control region within the room will also have minimized or reduced sound. The control region is denoted D. For aperture Active Noise Control (ANC), global control may be ensured by specifying this control region in all directions from the aperture into the room. Hence, in the 2D simulations, the control region is denoted as an arc with finite thickness:

$$\mathbb{D}_{2D} = \begin{cases} r_{min} \le r \le r_{max}, \\ 0 \le \theta \le \frac{\pi}{2}, \\ \phi = \frac{\pi}{2} \ \& \ \phi = -\frac{\pi}{2}, \end{cases} \tag{4-1}$$

where $r_{min}$ and $r_{max}$ determine the thickness of the arc. This is visualized in FIG. 10, which shows a 2D cross-section of the environment with control region D. In the illustrated example the control region D is a hemisphere in the far-field, between $r_{min}$ and $r_{max}$ from the aperture. Moreover, the 3D control region may be specified as a half spherical shell with finite thickness, and extend Eq. (4-1) to:

$$\mathbb{D}_{3D} = \begin{cases} r_{min} \le r \le r_{max}, \\ 0 \le \theta \le \frac{\pi}{2}, \\ 0 \le \phi \le 2\pi, \end{cases} \tag{4-2}$$

A finite thickness ensures that global control is obtained in all directions. A new wavefront may be created, based on the current wavefront with reduced sound energy in the control region. Consequently, the new wavefront behind the control region has reduced sound energy.

In some embodiments, the 3D control region covers an entirety of the aperture 30 so that the 3D control region intersects sound entering the room through the aperture 30 from all directions.

It should be noted that designing the wave-domain algorithm based on the 3D control region not only allows noise to be canceled or reduced in the 3D control region, but also results in noise being canceled or reduced behind the 3D control region (i.e., outside the 3D control region and away downstream from the aperture) due to the shape and size of the 3D region. Thus, noise in the entire room is canceled or reduced.

4-2 Algorithm

This section discusses an exemplary algorithm for the open-loop wave-domain controller, applicable to both the 2D and 3D situations. The controller may be implemented in the processing unit 50 of the apparatus 10 of FIG. 1A. The algorithm employs a soundfield basis expansions, which will be discussed below.

The following notation is used in the below discussion: matrices and vectors are denoted with upper and lower boldface respectively: C and y. $x \in \mathbb{R}^3$ is an arbitrary spatial observation point. The number of loudspeakers is Q.

4-2-1 Soundfield Basis Expansion

A soundfield function may be written as a sum of weighted basis functions, where the basis function set is an orthonormal set of solutions to the Helmholtz equation. The Fourier transform of the time-domain wave equation gives the Helmholtz equation, defined as:

$$\nabla^2 p + k^2 p = 0, \tag{4-3}$$

with function p(x, y, z, ω) and wavenumber k. FIG. 11 illustrates the concept of soundfield basis expansion, where a finite sum of simple waves can be used to describe an arbitrary soundfield in an observation region.

This may be derived in equations. The soundfield over the observation region at single wavenumber k, denoted S(x, k): $D \times \mathbb{R} \rightarrow \mathbb{C}$ is written as a weighted series of basis functions $\{U_g\}_{g \in G}$:

$$S(x, k) = \sum_g E_g U_g(x, k), \tag{4-4}$$

where S(x, k) is the soundfield, $E_g$ are G coefficients and $U_g(x, k)$ is a G×1 vector. All feasible solutions on D may be assumed to fall in the Hilbert space spanned by the orthonormal set $\{U_g\}_{g \in G}$. The inner-product is defined as:

$$\langle Y_1, Y_2 \rangle_{\mathbb{D}} = \int_{\mathbb{D}} Y_1(x) Y_2^H(x) dx, \tag{4-5}$$

where Y1 and Y2 are functions of the form Y1: $\mathbb{R}^3 \rightarrow \mathbb{R}$ and Y2: $\mathbb{R}^3 \rightarrow \mathbb{R}$. The integration is conducted in the domain of $D^3$. The orthonormal set $U_g(x, k)$ has the property $\langle U_i(x, k), U_j(x, k) \rangle = \delta_{ij}$. For a given S(x, k) and $U_g(x, k)$, the coefficients $E_g$ are obtained with $E_g = \langle S(x, k), U_g(x, k) \rangle$.

4-2-2 Orthonormalization of a Set of Basis Functions

The orthonormal set of basis functions may be denoted as a vector:

$$U = [U_1 U_2 \ldots U_G]^T \tag{4-6}$$

To find this set, we start with a set of non-orthogonal functions that solve the wave-equation. A simple set of solutions is plane waves. We set $f_g(x, k)$: $\mathbb{R}^3 \times \mathbb{R} \rightarrow \mathbb{C}$ that represent G plane waves in G directions, defined as:

$$f_g(x,k) = e^{jkx \cdot \hat{\beta}_g}, \tag{4-7}$$

where $\hat{\beta}g$ is the unit vector in the direction of the g-th plane wave. Let us first derive the 2D case. Here, $\beta_g' = (g-1)\Delta\beta$, g=1, . . . , G with $\Delta\beta = 2\pi/G$ and finally $\hat{\beta}_g \equiv (1, \beta'_g)$, such that we have the directions evenly distributed over a 2D plane. For the 3D case, we use a dataset of evenly distributed directions in a sphere and set $\hat{\beta}_g \equiv (1, \theta_g, \phi_g)$. We normalize each basis function with Eq. (4-5) to obtain $f_g(x, k) = f_g / \|f_g\|$ and combine the set of normalized plane waves in a vector:

$$\hat{f} = [\hat{f}_1 \hat{f}_2 \ldots \hat{f}_G]^T, \tag{4-8}$$

Next, a lower triangular matrix R is determined such that $U = R\hat{f}$, where U is the vector containing G orthonormal basis functions. We define a matrix containing inner-products of Eq. (4-8) with itself for all angles:

$$F = \hat{f}\hat{f}^T = \begin{bmatrix} F_{(1,1)} & F_{(1,2)} & \dots & F_{(1,G)} \\ F_{(2,1)} & F_{(2,2)} & & \vdots \\ \vdots & & \ddots & \\ F_{(G,1)} & \dots & \dots & F_{(G,G)} \end{bmatrix}, \quad (4\text{-}9)$$

where F is positive definite: $x^H Fx>0\ \forall x \in C^n$. The matrix R is defined as lower triangular, leading to:

$$\begin{bmatrix} U_1 \\ U_2 \\ \vdots \\ U_G \end{bmatrix} = \begin{bmatrix} R_{(1,1)} & 0 & \dots & 0 \\ R_{(2,1)} & R_{(2,2)} & \dots & 0 \\ \vdots & \vdots & \ddots & \vdots \\ R_{(G,1)} & R_{(G,2)} & \dots & R_{(G,G)} \end{bmatrix} \begin{bmatrix} \hat{f}_1 \\ \hat{f}_2 \\ \vdots \\ \hat{f}_G \end{bmatrix}, \quad (4\text{-}10)$$

Next, we define $V=R^{-1}$, also a lower triangular matrix, and the following steps are taken:

$$I=UU^T=R\hat{f}\hat{f}^T R^T=RFR^T, \quad (4\text{-}11)$$

and multiply both sides with P leads to $$VIP^T=VRFR^TV^T, \quad (4\text{-}12)$$

which, with $V=R^{-1}$, is equal to the Choleski decomposition:

$$VV^T=F. \quad (4\text{-}13)$$

Finally, the orthonormal set of basis functions is obtained as $U=R\hat{f}=V^{-1}\hat{f}$, where the inverse exists because P is square and positive definite.

Numerical Stability—The inner product between two plane waves in a perfect opposite direction results in 0. However, the Choleski decomposition utilizes a positive-definite matrix. Therefore, the Choleski decomposition is implemented with an adjusted F matrix. We define:

$$\tilde{F}=F+vI, \quad (4\text{-}14)$$

where $v=1^{-20}$ and I is the identity matrix. This further ensures numerical stability and prevents problems resulting from rounding errors due to numerical integration.

4-2-3 Soundfield Expressions

In this section, the procedure to obtain filter weights Iq(k) for all loudspeakers q at wavenumber k is discussed. The following procedure is repeated for wavenumbers k frequency bins corresponding to up to 2 kHz. First, the soundfields of the aperture may be written as a sum of orthonormal basis functions:

$$S^{ap}(x, k) = \sum_{g=1}^{G} A_g U_g(x, k). \quad (4\text{-}15)$$

Weights $A_g$ are obtained with the inner product:

$$A_g=\langle H^{ap}(x,k),U_g(x,k)\rangle \quad (4\text{-}16)$$

where $H^{ap}$ is from Eq. (3-9) (for 2D) or Eq. (3-3) (for 3D). Note that this is the low-resolution frequency response, depending on the window-size N. This may limit the accuracy of the algorithm. Next, we create a coefficient vector:

$$a=[A_1A_2 \dots A_G]^T, \quad (4\text{-}17)$$

and a vector containing inner products between the ATF and the normalized basis functions denoted as:

$$H_{\hat{f}}^{ap}=[\langle H^{ap},\hat{f}_1\rangle\ \langle H^{ap},\hat{f}_2\rangle \dots \langle H^{ap},\hat{f}_G\rangle]^T. \quad (4\text{-}18)$$

Plugging in $U=R\hat{f}$ gives $a=RH_{\hat{f}}^{ap}$. Consequently, we have a vector a containing the coefficients to describe the soundfield of the aperture as a sum of plane waves from Eq. (4-7). Note that this final equation is determined such that it depends on R. By doing this, the complexity of the evaluated integrals is limited. Instead of having to evaluate the inner-products between the orthonormal basis functions in U and $H^{ap}$, the controller (e.g., the processing unit 50) may compute the less complex inner-products between f and $H^{ap}$ to obtain the coefficient vector a. Next, a similar procedure may be applied to the soundfield from the loudspeaker array. The soundfield from a single loudspeaker may be written as:

$$H_q^{ls}(x, k) = \sum_{g=1}^{G} C_g^q U_g(x, k), \quad (4\text{-}19)$$

with $H^{ls}_q$ from Eq. (3-15) and coefficients $C^q_g$. The soundfield of the complete array is expanded as:

$$S^{ar}(x, k) = \sum_{g=1}^{G} B_g U_g(x, k), \quad (4\text{-}20)$$

with coefficients $B_g$. The soundfield from the array can also be expressed the sum of the soundfields from all individual loudspeakers, multiplied by their filter weights, giving:

$$S^{ar}(x, k) = \sum_{q=1}^{Q} l_q(k) H_q^{ls}(x, k). \quad (4\text{-}21)$$

Substituting Eq. (4-20) and Eq. (4-19) in Eq. (4-21), generates coefficients $B_g$ as:

$$B_g = \sum_{q=1}^{Q} l_q(k) C_g^q, \quad (4\text{-}22)$$

where the coefficients are calculated using $C^q_g=\langle H^{ls}_q(X, k), U_g(X, k)\rangle$. In matrix form we have $C=RH_{\hat{f}}^{ls}$ defined as:

$$\begin{bmatrix} C_1^1 & C_2^1 & \dots & C_1^G \\ C_2^1 & C_2^2 & & \vdots \\ \vdots & & \ddots & \\ C_G^1 & \dots & \dots & C_G^G \end{bmatrix} = R \begin{bmatrix} \langle H_1^{ls}, \hat{f}_1\rangle & \langle H_2^{ls}, \hat{f}_1\rangle & \dots & \langle H_Q^{ls}, \hat{f}_1\rangle \\ \langle H_1^{ls}, \hat{f}_2\rangle & \langle H_2^{ls}, \hat{f}_2\rangle & & \vdots \\ \vdots & & \ddots & \\ \langle H_1^{ls}, \hat{f}_G\rangle & \dots & \dots & \langle H_Q^{ls}, \hat{f}_G\rangle \end{bmatrix}. \quad (4\text{-}23)$$

Here $H_{\hat{f}}^{ls}$ is filled with the inner products between the basis functions $\hat{f}_i$ and the loudspeaker ATFs $H^{ls}_q$. Finally, the matrix C that contains the coefficients to describe the soundfield from the loudspeaker array is obtained as a sum of plane waves from Eq. (4-7). Again, note that R is used in this final notation to limit the complexity of the integrals. Determining the matrix C (containing the coefficients for describing soundfield from the loudspeaker array) based on R greatly simplifies the calculation and reduces the amount of processing power required in the calculation.

4-2-4 Filter-Weight Calculation

The next step is to calculate the loudspeaker weights such that the sum of the soundfields is minimized, or at least reduced. The control problem may be set as $J(Iq)=S_{ap}(x, k)+S^{ar}(x, k)$ and $\eta=\|J(Iq)\|^2$ and minimize in least mean square sense: $\min_{Iq}\|J(Iq)\|^2$, obtaining:

$$\eta=\|S^{ap}(x,k)+S^{ar}(x,k)\|^2. \tag{4-24}$$

With the orthonormality property ($\langle U_i(x, k), U_j(x, k)\rangle=\delta_{ij}$) and by plugging in Eq. (4-15) and Eq. (4-20), Eq. (4-24) may be reduced to $$\eta=\left\|\sum_{g=1}^{G}A_gU_g(x,k)+\sum_{g=1}^{G}B_gU_g(x,k)\right\|^2=\sum_g\|A_g+B_g\|^2. \tag{4-25}$$

With the knowledge that $\langle U_i, U_j\rangle=0$, we can rewrite in matrix form. We denote b=Cl where $l=[l_1\ l_2\ldots l_Q]^T$ and omit k for notation purposes. Furthermore, we add the regularization term τl with τ>0, to constrain the loudspeaker effort to preventing distortion and ensure a robust solution:

$$\eta=\|b+a\|^2+\|\tau l\|^2=(b+a)^H(b+a)+\tau\|l\|^2. \tag{4-26}$$

Eq. (4-26) is rewritten to obtain:

$$\eta=(Cl+a)^H(Cl+a)+\tau\|l\|^2$$

$$\eta=(Cl)^HCl+(Cl)^Ha+a^HCl+a^Ha+\tau\|l\|^2, \tag{4-27}$$

and the derivative is taken and set to zero to find the minimum:

$$\frac{\partial}{\partial\eta}=2C^HCl+2C^Ha+2\tau\|1\|=0 \tag{4-28}$$

$$(C^HC+\tau I)1=-C^Ha,$$

to obtain the final equation for the filter weights at single wavenumber k:

$$l=-(C^HC+\tau I)^{-1}C^Ha. \tag{4-29}$$

with $C=RH^{ls}_{\hat{f}}$ and $a=RH^{ap}_{\hat{f}}$ and 1 being an identity matrix.

It should be noted that splitting C and a with matrix R and the inner-product matrix (i.e., expressing C based on matrix R and $H^{ls}_f$, and expressing a based on matrix R and $H^{ap}_f$) is beneficial for computational purposes. It reduces the complexity of the inner-product integrals that need to be calculated significantly.

In some embodiments, the processing unit 50 of the apparatus 10 is configured to determine filter weights for the speakers 40 based on the above concepts. Also, in some embodiments, the processing unit 50 may be configured to determine the filter weights and/or to generate control signals (for operating the speakers 40) based on one or more of the above equations, and/or based on one or more of the parameters in the above equations.

The above technique of utilizing orthonormal basis functions is advantageous because it obviates the need for the processing unit 50 to evaluate complex integrals, and reduces the computational complexity of the algorithm. In some embodiments, the processing unit 50 is configured to orthonormalize a set of basis functions by applying the Choleski decomposition on an inner-product matrix of normalized basis functions. Also, in some cases, the algorithm involves only a single expression for the filter-weights. This expression calculates the filter-weights for all loudspeakers, for a single wavenumber k, and is repeated over each wavenumber.

4-2-5 Algorithmic Delay Compensation

The block processing with Short-time Fourier Transform (STFT) in the wave-domain algorithm induces an algorithmic delay. More specifically, the window-size N of the STFT sets the length of the delay. Algorithmic delay compensation can be done in various ways. For example, the delay compensation may be addressed by reference microphone placement and/or signal prediction.

Reference Microphone Placement for Algorithmic Delay Compensation

The algorithmic delay is equal to the length of the STFT block set by the window-size N. One method to compensate for the algorithmic delay is by positioning the reference microphone at a certain distance upstream from the aperture. Thus, in some embodiments, one or more of the microphones 20 of the apparatus 10 may be positioned upstream with respect to the aperture 30. This allows the processing unit 50 to have sufficient time to process the microphone signals (based on the algorithm described herein) to generate control signals for operating the speakers 40. This is a feasible solution for certain physical setups where the noise source is far from the aperture. However, in some cases, this distance cannot be too long to keep the setup practical. The time the wave travels from the microphone to the aperture is the time for which we can compensate. We have the simple equation:

$$r_{ref}=\frac{cN}{f_s}, \tag{4-30}$$

where $r_{ref}$ is the distance in m from the reference microphone to the middle of the aperture, c is the speed of sound, N is the processing-window size, and $f_s$ is the sample rate. For example, a window size of N=32 samples would lead to $r_{ref}\approx 1.4$ m, which is a feasible distance in many practical scenarios. Note that longer distances may be possible. It may, for example, be reasonable to place one or more microphone close to a stationary noise source.

Signal Predictor for Algorithmic Delay Compensation

The second compensation method is a signal predicting algorithm. Here, the concept is to predict, each hop m, N samples in the future, with the measured signals up to that point. An Autoregressive (AR) model of order p may be constructed:

$$v(n)=\sum_{i=1}^{p}\alpha_iv(n-i), \tag{4-31}$$

that has no trends or seasonality. We employ the Yule-Walker Equations to calculate its coefficients ($\alpha_i$), fitting the model on the last W samples. This predictor is implemented such that the predicted signal is the input of the STFT in the block processing. Expressed in equations, for each hop m, the following process is repeated. The input vector is:

$$x_m=[x_m(n-1),x_m(n-2),\ldots,x_m(n-W)], \tag{4-32}$$

where W is the number of input samples. $x_m$ is then used in the Yule-Walker equations to obtain $\alpha=[\alpha_1, \alpha_2, \ldots, \alpha_p]$, the AR model with p parameters. Then, the predicted signal is obtained:

$$v_m=[v_m(n),v_m(n+1),\ldots,v_m(n+N-1)], \tag{4-33}$$

by deploying Eq. (4-31) over the prediction horizon N. Finally, $v_m$ is the input of the STFT-hop m in Eq. (3-17) in the simulation model. This process is repeated for each hop m.

In some embodiments, the processing unit 50 may be configured to perform signal prediction based on a model that implements the above concepts.

4-3 Number of Basis Functions

For the implementation of the wave-domain algorithm in the controller (e.g., the processing unit 50), the number (G) of basis functions may influence the performance.

The soundfield basis function expansion rests on the fact that a finite number of basis functions is used to describe any soundfield within a defined region. The size of the defined region and the wavenumber influence the number of basis functions to be implemented in the controller (e.g., the processing unit 50). For 2D disc-shaped spatial regions of radius r, a minimum of $G_{2D}=(\lceil 2kr \rceil+1)$ basis functions are desirable. In the case of a spherical 3D spatial region, at least $G_{3D}=\lceil ekr/2+1 \rceil^2$ basis functions are desirable. In other embodiments, the number of basis functions may be fewer than the examples described.

The number of basis functions directly influences the number of calculations necessary in the algorithm, as the shape of C and a in Eq. (4-29) depend on it. More basis functions result in a higher computational effort. In some embodiments, the 2D control region may not be defined as a disc, but may be defined as a thick arc in 2D (Eq. (4-1)). In 3D, a half-spherical thick shell, not a full sphere, may be used (see Eq. (4-2)). Thus, a lower number of basis functions may be used to obtain similar performance (compared to the case in which a full sphere is used as the control region). The computational decrease for the 2D simulations is negligible, but reducing G in 3D calculations may make a substantial difference. In summary, we set $$G_{2D}=(\lceil 2kr_{max} \rceil+1), \tag{4-34}$$

and determine $G_{3D}$ by calculating the attenuation performance for a various number of basis functions, where we use $$G_{3D}=\lceil \beta ekr_{max}/2+1 \rceil^2, \tag{4-35}$$

and compare for various scaling factors of $\beta=1/32, 1/16, 1/8, 1/4$.

5. Attenuation Performance in 3D Simulation Environment

To illustrate the utility and advantageous of the apparatus 10, a 3D simulation environment was created, which includes a room with an aperture like that shown in FIG. 1A. The aperture is a window with crossbar carrying a set of speakers. A grid 49-loudspeaker array and a sparse 21-loudspeaker array were compared. Also, the performance of the wave-domain algorithm and the reference LMS algorithm were compared. We assumed that, by measuring the performance in all directions, any reflection is irrelevant. Therefore, no walls were modeled. The cross-section (x=0) top-view of the environment is similar to that depicted in FIG. 4A, with coordinates (x; y; z) pointing into the paper, upwards and to the right. The dot in the center is a reference microphone, the neighbouring dots are loudspeakers and the dots arranged along a curvilinear path represent evaluation microphones. In 3D, the aperture was a Lx=0.5 m by Ly=0.5 m window, with a crossbar of width W+=0.065 m. Hence, the aperture consisted of four squares (P^=4) with ΔLx=(Lx−W+)=2=ΔLy. The 2D model was a Ly-wide aperture with a crossbar of width W+ and P^=2.

All controllers used one reference microphone, in the aperture origin and were implemented with the sparse and grid array. The NLMS was tested 32 (2D) and 128 (3D) error microphones in the control region. The optimal wave-domain controller (WDC-O) used a window-size of 125 ms. Additionally, algorithmic delay compensation was modeled by two approaches. One controller with the reference microphone positioned at 1.4 m in front of the aperture, implemented with a processing-window size of 3.9 ms (WDC-M) and the other as a wave-domain controller with auto regressive predictor (WDC-P). The wave-domain algorithms used a 75% STFT overlap. Sample rate was set at fs=214 Hz. A fixed air temperature and density ($\rho_0$) were used, setting constant speed of sound at c=343 m/s. To measure the performance of the controllers over time with a changing frequency spectrum, a rumbler-siren signal of 4 s was used as noise. Additionally, white noise and airplane noise were tested. We evaluated the performance up to 2 kHz and for three incident angles: 0°, 30° and 60°. The performance was evaluated on the boundary of control regions D2D and D3D at 30 and 128 evenly distributed evaluation microphones, respectively. We define the segmental SNR in dB, summed over all evaluation microphones e as:

$$SEG_f(k, m) = 10\log_{10}\frac{\sum_e^E |d_e(k, m)|^2}{\sum_e^E |d_e(k, m) + y_e(k, m)|^2}$$

where $d_e$ is the noise signal and $y_e$ is the loudspeaker array signal. We average $SEG_f$(k; m) over frequency and time, to get insights per frequency bin ($SEG_f$(k)), per hop ($SEG_f$(m)) and in total (SNR). Performance was calculated over signal blocks with an 8 ms STFT with 50% overlap.

Figure 13:
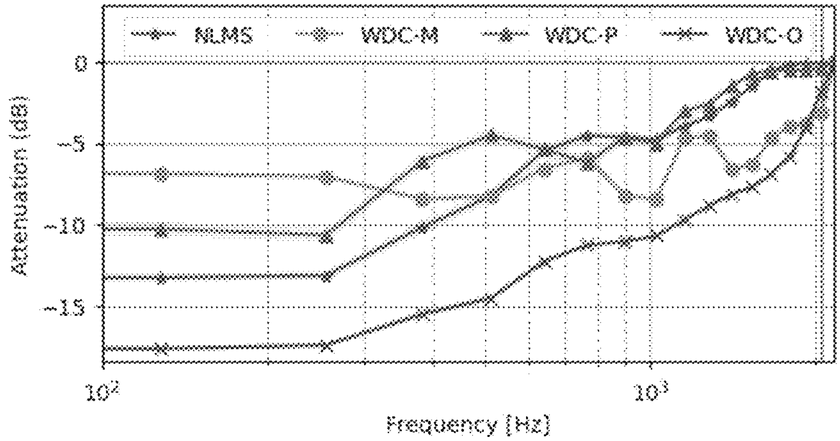
Figure 14:
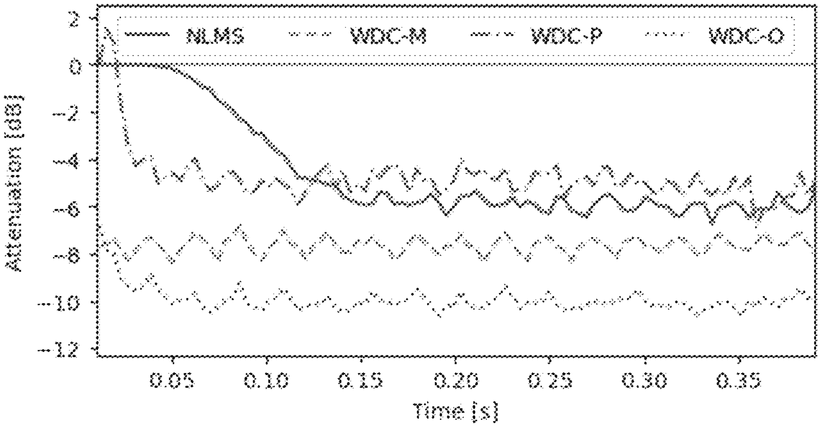
Figure 15:
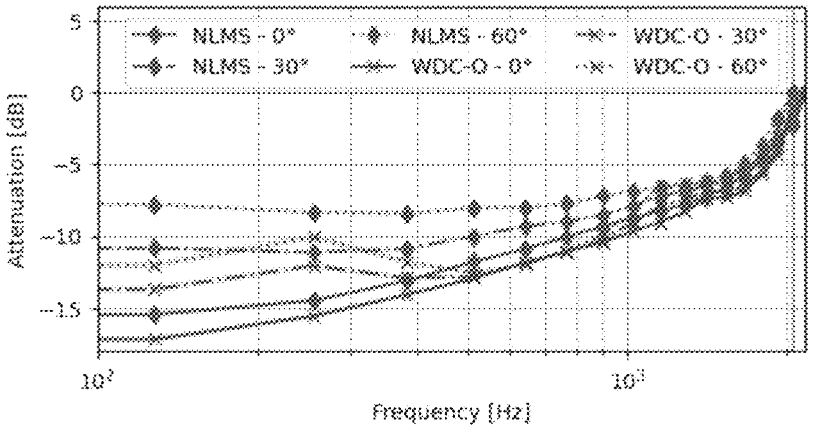

FIG. 12 shows the performance for all signals at 0° incident angle, where the grid outperformed the sparse array. WDC-O (optimal wave-domain controller) generated more attenuation than NLMS (normalized least mean squares), when cancelling rumbler-siren noise, especially at higher frequencies as shown in FIG. 13. Additionally, FIG. 14 shows the slow convergence of NLMS, fast convergence of WDC-P (predictor wave-domain controller), and instant convergence of WDC-O and WDC-M. Following FIG. 15, WDC-O outperformed NLMS with better attenuation for each incident angle. When comparing algorithmic delay compensation methods, WDC-M slightly outperformed the WDC-P, with a grid array setup. Moreover, for WDC-P, a trade-off between prediction accuracy and algorithm performance was apparent so an optimal window-size can be found. However, this optimum highly depends on the type of signal. For signals that are better predictable, the optimal window-size is larger. Finally, all controllers perform better at lower frequencies, except for WDC-M. For the latter, phase-shifts in the blockwise signal processing result in STFT wrapping. The grid array outperformed the sparse array, confirming prior studies. Besides, both the performance of white noise cancelling, and occurrence of long convergence time of the NLMS controller is in line with existing literature. For a stationary noise source, slow convergence is not a major issue. However, we expect that it limits the NLMS performance for moving noise source. In contrast, with instant convergence, the wave-domain controller is expected to perform better. Offline calculation of filter-weights in WDC-O is a major advantage over closed-loop algorithms.

6. Specialized Processing System

Figure 16:
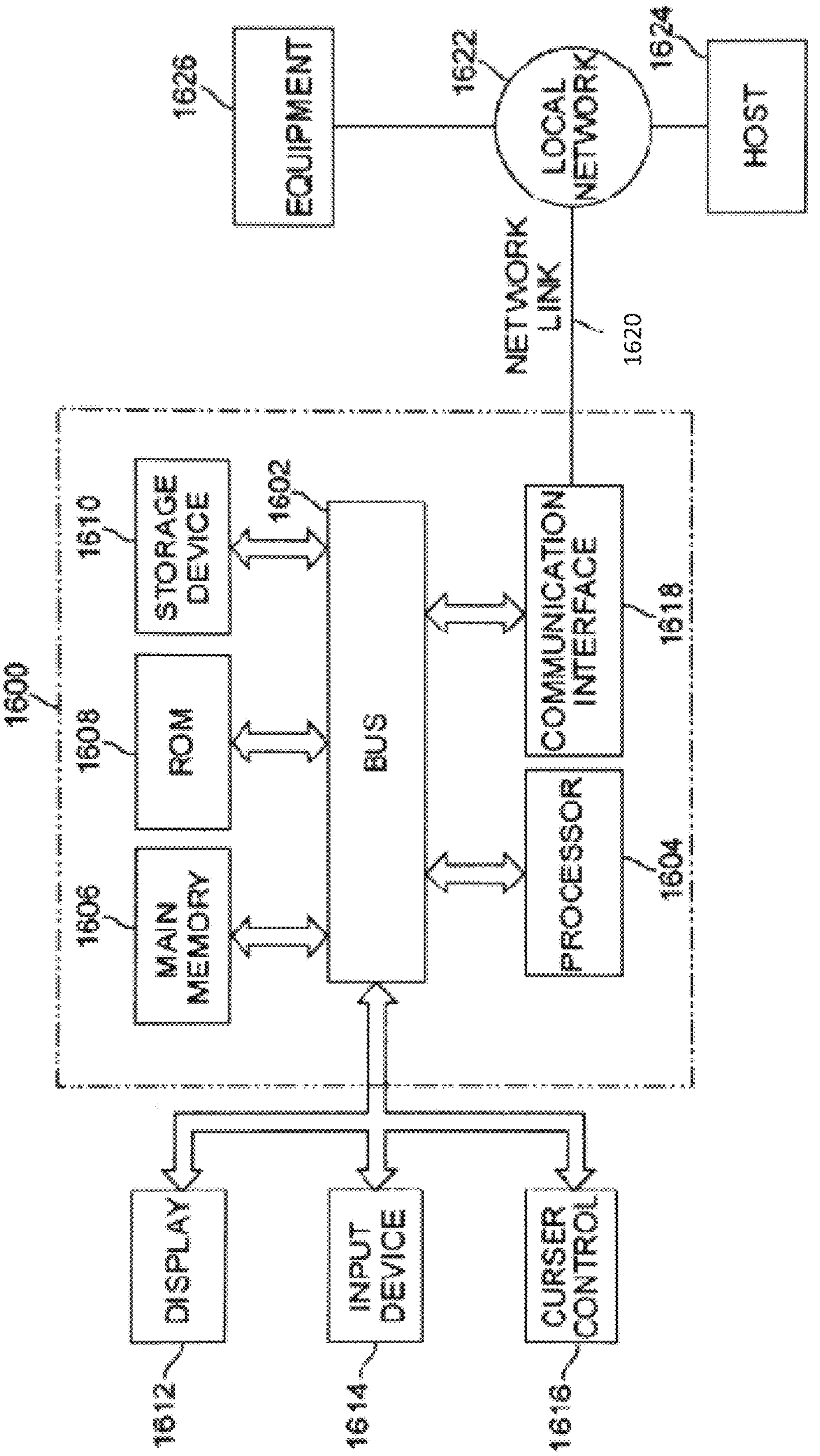
FIG. 16 illustrates an example of a processing system.

FIG. 16 illustrates a specialized processing system 1600 for implementing the method(s) and/or feature(s) described herein.

For example, in some embodiments, the processing system 1600 may be a part of the apparatus 10 of FIG. 1A, and/or may be configured to perform the method 100 of FIG. 1B.

Processing system 1600 includes a bus 1602 or other communication mechanism for communicating information, and a processor 1604 coupled with the bus 1602 for processing information. The processing system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processing system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processing system 1600 may be coupled via the bus 1602 to a display 167, such as a screen or a flat panel, for displaying information to a user. An input device 1614, including alphanumeric and other keys, or a touchscreen, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processing system 1600 can be used to perform various functions described herein. According to some embodiments, such use is provided by processing system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk of a remote computer. The remote computer can load the instructions into its dynamic memory and send the instructions over a network, such as the Internet or a local network. A receiving unit local to the processing system 1600 can receive the data from the network, and provide the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card or a modem to provide a data communication connection to a corresponding type of telephone line. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

In some embodiments, the processing system 1600, or one or more components therein, may be considered a processing unit.

Also, in some embodiments, the methods described herein may be performed and/or implemented using the processing system 1600. For example, in some embodiments, the processing system 1600 may be an electronic system configured to generate and to provide control signals to operate the speakers 40. The control signals may be independent of an error-microphone output, and/or may be based on an orthonormal set of basis functions.

Although the above embodiments have been described with reference to the aperture being a window of a room, in other embodiments, the apparatus 10 and method 100 described herein may provide active noise control for other types of apertures, such as a door of a room, or any aperture of any building structure. The building structure may be a fence in an open space in some embodiments. In such cases, the apparatus and method described herein provide ANC of sound coming from one side of the fence, so that sound in the open space on the opposite side of the fence is canceled or at least reduced.

Also, in the above embodiments, the apparatus and the method have been described as providing control signals to operate the speakers, wherein the control signals are independent of an error-microphone output. In other embodiments, the apparatus may optionally include one or more error-microphones for providing one or more error-microphone outputs. In such cases, the processing unit 50 may optionally obtain the error-microphone output(s), and may optionally process such error-microphone output(s) to generate the control signals for controlling the speakers.

Furthermore, the filter weights (or coefficients) have been described as being computed off-line. This is particularly advantageous for ANC of sound from a spatially stationary source. In such cases, the filter weights are computed independent of the incoming noise from stationary sound source. In other embodiments, the apparatus 10 and method 100 described herein may be utilized to provide ANC of sound from a moving source (e.g., airplane, car, etc.). In such cases, wavefront changes direction, and the filter weights (or coefficients) are updated continuously, and are not computed off-line. Since the wave-domain approach requires no time or significantly less time (compared to existing approaches) to converge, this feature advantageously allows the apparatus 10 and method 100 described herein to provide ANC of sound from a moving source. In some embodiments, the filter weights may be updated in real-time based on the direction of the incoming sound. In other embodiments, the filter weights may be computed off-line for different wavefront directions. During use, the processing unit 50 determines the appropriate filter weight for a given direction of sound from a moving source by selecting one of the computed filter weights based on the direction of sound. This may be implemented using a lookup table in some embodiments.

In this disclosure, any of the parameters (such as any of the parameters in any of the disclosed equations) described herein may be a variable, a vector, or a value.

One or more embodiments described herein may include one or more of the features described in the below items:

Item 1: An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers, wherein the control signals are independent of an error-microphone output.

Item 2: The apparatus of Item 1, wherein the processing unit is configured to obtain filter weights for the speakers, and wherein the control signals are based on the filter weights.

Item 3: The apparatus of Item 2, wherein the filter weights for the speakers are independent of the error-microphone output.

Item 4: The apparatus of Item 2, wherein the filter weights for the speakers are based on an open-loop algorithm.

Item 5: The apparatus of Item 2, wherein the filter weights for the speakers are determined off-line.

Item 6: The apparatus of Item 2, wherein the filter-weights for the speakers are based on an orthonormal set of basis functions.

Item 7: The apparatus of Item 6, wherein the filter-weights for the speakers are based on inner products between the basis functions in the orthonormal set and acoustic transfer functions of the speakers.

Item 8: The apparatus of Item 2, wherein the filter-weights for the speakers are based on a wave-domain algorithm.

Item 9: The apparatus of Item 8, wherein the wave-domain algorithm provides a lower computation cost compared to a least-mean-squares (LMS) algorithm.

Item 10: The apparatus of Item 8, wherein the wave-domain algorithm operates in a temporal frequency domain, and wherein the processing unit is configured to transform signals with short-time Fourier Transform.

Item 11: The apparatus of Item 10, wherein the short-time Fourier Transform provides a delay, and wherein the apparatus is configured to compensate for the delay using signal prediction and/or placement of the one or more microphones.

Item 12: The apparatus of item 10, wherein the short-time Fourier Transform provides a delay, and wherein the apparatus is configured to compensate for the delay based on a placement of the one or more microphones.

Item 13: The apparatus of Item 1, wherein the building structure comprises a room, and wherein the processing unit is configured to operate the speakers so that at least some of the sound is cancelled or reduced within a region that is located behind the aperture inside the room.

Item 14: The apparatus of Item 13, wherein the region covers an entirety of the aperture so that the region intersects sound entering the room through the aperture from all directions.

Item 15: The apparatus of Item 13, wherein the region has a width that is anywhere from 0.5 meter to 3 meters.

Item 16: The apparatus of Item 13, wherein the region has a volume that is less than 10% of a volume of the room.

Item 17: The apparatus of Item 13, wherein the processing unit is configured to obtain filter weights for the speakers, the filter weights being based on an algorithm in which the region is defined by a shell having a defined thickness.

Item 18: The apparatus of Item 17, wherein the shell comprises a partial spherical shell.

Item 19: The apparatus of Item 1, wherein the building structure comprises a room, and wherein the aperture comprises a window or a door of the room.

Item 20: The apparatus of Item 1, wherein the one or more microphones are positioned and/or oriented to detect the sound before the sound enters through the aperture.

Item 21: The apparatus of Item 1, wherein the processing unit is configured to provide the control signals to operate the speakers without requiring the error-microphone output from any error-microphone.

Item 22: The apparatus of Item 1, wherein the processing unit is configured to obtain filter weights for the speakers, the filter weights being based on transfer function(s) for the aperture modeled as:

$$H^{ap}(x, k, \theta_0, \phi_0) = \frac{jck\rho 0}{2\pi}\dot{\omega}_0 \Delta L_x \Delta L_y \sum_{i=1}^{\hat{P}} D_i$$

where x is a position, k is a wave number, $(\theta_0, \phi_0)$ is incident angle of a plane wave representing noise, j is an imaginary number, c is the speed of sound, $w'_0$ is a gain constant, $\Delta L_x$ and $\Delta L_y$ are aperture section dimensions and PA is a number of aperture sections, and $D_i$ is a directivity.

Item 23: The apparatus of Item 1, wherein the processing unit is configured to obtain filter weights for the speakers, the filter weights being based on a matrix C and a matrix a, wherein:

$$C=RH^{ls}_f \text{ and } a=RH^{ap}_f$$

R is a triangular matrix, $H^{ls}_f$ is transfer function(s) for the speakers, and $H^{ap}_f$ is transfer function(s) for the aperture.

Item 24: The apparatus of item 1, wherein the processing unit is also configured to obtain an error-microphone output from an error-microphone during an off-line calibration procedure.

Item 25: The apparatus of item 1, wherein the sound is from a stationary sound source or from a moving sound source.

Item 26: An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers;

wherein the processing unit is configured to provide the control signals based on filter weights, and wherein the filter weights are based on an orthonormal set of basis functions.

Item 27: The apparatus of Item 26, wherein the filter weights are calculated off-line based on the orthonormal set of basis functions.

Item 28: An apparatus for providing active noise control, comprising a processing unit, wherein the processing unit is configured to communicatively couple with:

one or more microphones configured to detect sound entering through an aperture of a building structure, and a set of speakers configured to provide sound output for cancelling or reducing at least some of the sound;

wherein the processing unit is configured to provide control signals to operate the speakers; and wherein the control signals are independent of an error-microphone output, and/or wherein the processing unit is configured to provide the control signals based on filter weights, the filter weights being based on an orthonormal set of basis functions.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers, wherein the control signals are independent of an error-microphone output;

wherein the processing unit is configured to obtain filter weights for the speakers, and wherein the control signals are based on the filter weights; and wherein the filter-weights for the speakers are based on an orthonormal set of basis functions.

2. The apparatus of claim 1, wherein the filter weights for the speakers are independent of the error-microphone output.

3. The apparatus of claim 1, wherein the filter-weights for the speakers are based on inner products between the basis functions in the orthonormal set and acoustic transfer functions of the speakers.

4. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers;

wherein the processing unit is configured to obtain filter weights for the speakers, and wherein the control signals are based on the filter weights; and wherein the filter weights for the speakers are based on an open-loop algorithm.

5. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers;

wherein the processing unit is configured to obtain filter weights for the speakers, and wherein the control signals are based on the filter weights; and wherein the filter weights for the speakers are determined off-line.

6. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers;

wherein the processing unit is configured to obtain filter weights for the speakers, and wherein the control signals are based on the filter weights; and wherein the filter-weights for the speakers are based on a wave-domain algorithm.

7. The apparatus of claim 6, wherein the wave-domain algorithm provides a lower computation cost compared to a least-mean-squares (LMS) algorithm.

8. The apparatus of claim 6, wherein the wave-domain algorithm operates in a temporal frequency domain, and wherein the processing unit is configured to transform signals with short-time Fourier Transform.

9. The apparatus of claim 8, wherein the short-time Fourier Transform provides a delay, and wherein the apparatus is configured to compensate for the delay using signal prediction and/or placement of the one or more microphones.

10. The apparatus of claim 8, wherein the short-time Fourier Transform provides a delay, and wherein the apparatus is configured to compensate for the delay based on a placement of the one or more microphones.

11. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers;

wherein the building structure comprises a room, and wherein the processing unit is configured to operate the speakers so that at least some of the sound is cancelled or reduced within a region that is located behind the aperture inside the room.

12. The apparatus of claim 11, wherein the region covers an entirety of the aperture so that the region intersects sound entering the room through the aperture from all directions.

13. The apparatus of claim 11, wherein the region has a width that is anywhere from 0.5 meter to 3 meters.

14. The apparatus of claim 11, wherein the region has a volume that is less than 10% of a volume of the room.

15. The apparatus of claim 11, wherein the processing unit is configured to obtain filter weights for the speakers, the filter weights being based on an algorithm in which the region is defined by a shell having a defined thickness.

16. The apparatus of claim 15, wherein the shell comprises a partial spherical shell.

17. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers;

wherein the building structure comprises a room, and wherein the aperture comprises a window or a door of the room.

18. The apparatus of claim 17, wherein the sound is from a stationary sound source or from a moving sound source.

19. The apparatus of claim 17, wherein the control signals are based on filter weights.

20. The apparatus of claim 17, wherein the control signals are independent of an error-microphone output.

21. The apparatus of claim 17, wherein the one or more microphones are positioned and/or oriented to detect the sound before the sound enters through the aperture.

22. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers;

wherein the one or more microphones are positioned and/or oriented to detect the sound before the sound enters through the aperture.

23. The apparatus of claim 22, wherein the control signals are independent of an error-microphone output.

24. The apparatus of claim 22, wherein the control signals are based on filter weights.

25. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers, wherein the control signals are independent of an error-microphone output;

wherein the processing unit is configured to provide the control signals to operate the speakers without requiring the error-microphone output from any error-microphone.

26. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers;

wherein the processing unit is also configured to obtain an error-microphone output from an error-microphone during an off-line calibration procedure.

27. An apparatus for providing active noise control, comprising:

one or more microphones configured to detect sound entering through an aperture of a building structure;

a set of speakers configured to provide sound output for cancelling or reducing at least some of the sound; and a processing unit communicatively coupled to the set of speakers, wherein the processing unit is configured to provide control signals to operate the speakers;

wherein the processing unit is configured to provide the control signals based on filter weights, and wherein the filter weights are based on an orthonormal set of basis functions.

28. The apparatus of claim 27, wherein the filter weights are calculated off-line based on the orthonormal set of basis functions.

29. The apparatus of claim 27, the filter weights being based on transfer function(s) for the aperture modeled as:

$$H^{ap}(x, k, \theta_0, \phi_0) = \frac{jck\rho 0}{2\pi}\dot{\omega}_0 \Delta L_x \Delta L_y \sum_{i=1}^{\hat{P}} D_i$$

where x is a position, k is a wave number, $(\theta_0, \varphi_0))$ is incident angle of a plane wave representing noise, j is an imaginary number, c is the speed of sound, $\omega_o$ is a gain constant, ΔLx and ΔLy are aperture section dimensions and P/\ is a number of aperture sections, and $D_i$ is a directivity.

30. The apparatus of claim 27, the filter weights being based on a matrix C and a matrix a, wherein:

$$C=RH_{\hat{f}}^{ls} \text{ and } a=RH_{\hat{f}}^{ap}$$

R is a triangular matrix, $HS^{ls}_f$ is transfer function(s) for the speakers, and $H^{ap}_f$ is transfer function(s) for the aperture.

31. An apparatus for providing active noise control, comprising a processing unit, wherein the processing unit is configured to communicatively couple with:

one or more microphones configured to detect sound entering through an aperture of a building structure, and a set of speakers configured to provide sound output for cancelling or reducing at least some of the sound;

wherein the processing unit is configured to provide control signals to operate the speakers; and wherein the processing unit is configured to provide the control signals based on filter weights, the filter weights being based on an orthonormal set of basis functions.

* * * * *